(12) United States Patent
Momchilov et al.

(10) Patent No.: US 11,463,371 B2
(45) Date of Patent: Oct. 4, 2022

(54) DISCOVERY AND ADJUSTMENT OF PATH MAXIMUM TRANSMISSION UNIT

(71) Applicant: Citrix Systems, Inc., Fort Lauderdale, FL (US)

(72) Inventors: Georgy Momchilov, Parkland, FL (US); Rakesh Ranjan Jha, Pompano Beach, FL (US); Jeffrey Holsapple, Pompano Beach, FL (US); Sridharan Rajagopalan, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/890,661

(22) Filed: Jun. 2, 2020

(65) Prior Publication Data

US 2021/0168088 A1 Jun. 3, 2021

Related U.S. Application Data

(60) Provisional application No. 62/942,620, filed on Dec. 2, 2019.

(51) Int. Cl.
*H04L 47/36* (2022.01)
*H04L 47/628* (2022.01)
*H04L 69/16* (2022.01)

(52) U.S. Cl.
CPC .......... *H04L 47/365* (2013.01); *H04L 47/628* (2013.01); *H04L 69/16* (2013.01)

(58) Field of Classification Search
CPC ..... H04L 47/365; H04L 47/628; H04L 69/16; H04L 67/28; H04L 67/2876
See application file for complete search history.

(56) References Cited

U.S. PATENT DOCUMENTS 8,031,626 B2 * 10/2011 Wiley .................. H04L 1/0079
370/252
8,611,215 B2 * 12/2013 Katibian ................. H04L 47/10
370/230

(Continued)

FOREIGN PATENT DOCUMENTS

EP     3293928 A1    3/2018
EP     3331205 A1    6/2018

OTHER PUBLICATIONS

PCT/US2020/039333 ISR Report dated Nov. 6, 2020.
(Continued)

*Primary Examiner* — Chandrahas B Patel
(74) *Attorney, Agent, or Firm* — Banner & Witcoff, Ltd.

(57) ABSTRACT

Methods, systems, and apparatuses for discovering dynamic path maximum transmission unit (PMTU) between a sending computing device and a receiving computing device (e.g., a client device and a host device) are described herein. A sending computing device may iteratively transmit bursts of probe packets, each burst being defined by a search range between a maximum packet size and a minimum packet size. The sending computing device may iteratively update the search range based on the previous iteration until the search converges on the PMTU. When the PMTU is discovered, each of the computing devices may update their transport and presentation layer buffers based on the discovered PMTU without any other protocol level disruption. In a multi-path scenario, the computing device may discover PMTU for each of the paths and select a performance optimal path based on the individual PMTUs and other network characteristics such as loss, latency, and throughput.

23 Claims, 19 Drawing Sheets

(56) References Cited

U.S. PATENT DOCUMENTS

| | | | |
|---|---|---|---|
| 9,961,023 B2 | 5/2018 | Tsirkin | |
| 10,616,743 B2* | 4/2020 | Wojcieszak | H04W 72/1215 |
| 10,700,987 B2* | 6/2020 | Sreenivasan | H04L 45/26 |
| 10,897,516 B2 | 1/2021 | Wetterwald et al. | |
| 11,032,161 B2* | 6/2021 | Bentley | H04L 67/34 |
| 2017/0126572 A1 | 5/2017 | Sharma | |
| 2020/0236043 A1 | 7/2020 | Sze et al. | |
| 2021/0084617 A1 | 3/2021 | Dai et al. | |

OTHER PUBLICATIONS

Aug. 24, 2021—U.S. Office Action—U.S. Appl. No. 16/913,281.
Sep. 17, 2021—U.S. Office Action—U.S. Appl. No. 16/913,356.
Feb. 24, 2022—U.S. Final Office Action—U.S. Appl. No. 16/913,356.

\* cited by examiner

DISCOVERY AND ADJUSTMENT OF PATH MAXIMUM TRANSMISSION UNIT

CROSS REFERENCE TO RELATED APPLICATIONS

This application claims priority to U.S. Provisional Patent Application No. 62/942,620, filed Dec. 2, 2019 and entitled "Dynamic Path Maximum Transmission Unit (PMTU) Discovery and Adjustment," which is incorporated herein by reference in its entirety.

FIELD

Aspects described herein generally relate to computer networking, remote computer access, virtualization, enterprise mobility management, and hardware and software components related thereto.

BACKGROUND

Path maximum transmission unit (PMTU) may be understood as maximum transmission unit (MTU) for sending IP packets which may be honored by each network component in the path. The path may include, for example, a client, a host, a software defined wide area network (SD-WAN), connectors, and other intermediary components and network tunnels. A client or host sending packets smaller than the PMTU is achieving suboptimal throughput and/or interactivity, and therefore wasting network resources. Sending packets larger than the PMTU may lead to loss and retransmission of packets and packet fragmentation, thereby leading to inefficiencies such as "black-holes," where a network silently drops packets in transmission and eventually leading to dropped connections. Packets sized according to the PMTU may avoid these problems.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Existing methods of discovering PMTUs are unreliable and inefficient. The existing methods use help from intermediaries in the path and target host, both of which may not be always available and cannot be relied upon. The existing methods also may use very primitive searches, e.g., binary search, and the searching may interfere with and at times may supersede congestion control. Furthermore, the existing methods are static and do not provide a flexibility to accommodate different overheads in different types of paths and changing network conditions.

To overcome limitations described above, and to overcome other limitations that will be apparent upon reading and understanding the present specification, aspects described herein are directed towards a deterministic, efficient, and dynamic PMTU discovery and adjustment without help from intermediaries and without transport or presentation-level protocol disruption, for varying network characteristics. The aspects disclosed herein use deterministic, efficient, and time-bound search strategies using bursts probe packets, trailers, pivots, and retry timers. The PMTU discovery based on these aspects may not cause a transport or presentation level protocol disruption. The aspects described herein also determine a performance optimal path for different types of data (e.g., bulk vs. interactive) by determining, in addition to a PMTU, throughput, latency, and loss percentage for each of a plurality of paths in a network. When the network conditions change (e.g., rerouting due to a gateway failover), the aspects disclosed herein may dynamically perform PMTU discovery and recalculate other parameters such as the throughput, latency, and loss percentage.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
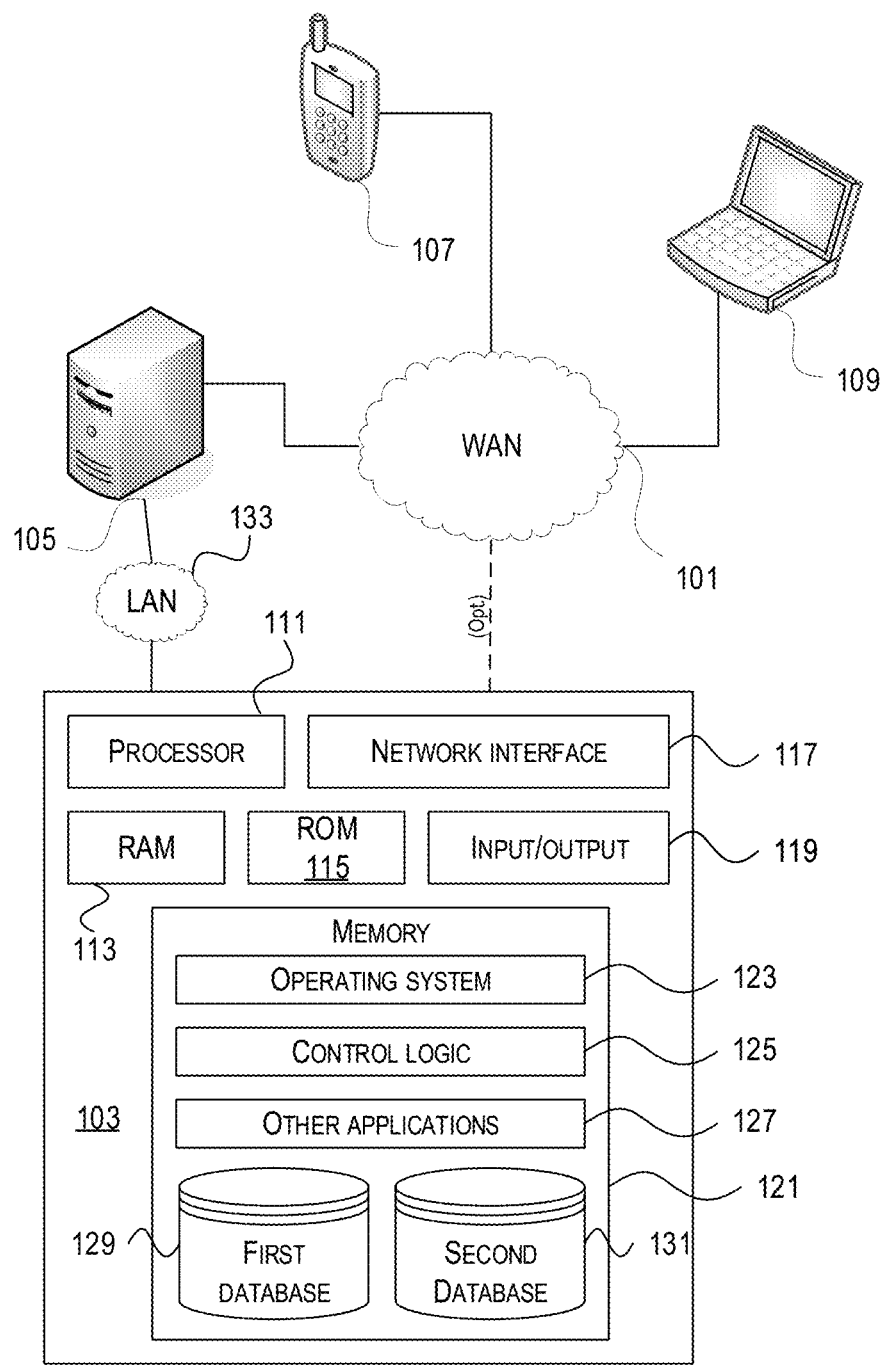
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards adjusting a PMTU by transmitting probe packets based on a search range defined by a maximum packet size and a minimum packet size, and receiving one or more responses, at least one response indicative of validity of a packet received at a receiving computing device. Data packets may then be sized according to the adjusted PMTU so as to prevent fragmentation of the data packets during their transmission.

Transmission of the packets may be iterative with iteratively updated search ranges. A search range for an iteration, for example, may be based on valid receipts of one or more packets from a previous iteration and/or any other optimization technique. For example, the minimum of a search range for an iteration may be larger than the largest probe packet that was validly received in the previous iteration and the maximum of the search range may be smaller than the largest probe packet that was not validly received in the previous iteration. A sending computing device and a receiving computing device (e.g., a host and a client) may perform multiple iterations until the search converges on the PMTU. The search strategy may also use different optimizations, such as checking for defaults (boundary conditions) before beginning a full search or using a last known PMTU as a starting point (referred to as a pivot).

This PMTU discovery using multiple iterations may not cause transport and presentation layer protocol disruption because the protocol buffers may be initialized prior to PMTU discovery and simply updated after the PMTU discovery. The computing devices may initialize corresponding protocol buffers to an initial size, e.g., receive buffers based on a theoretical maximum (e.g., 1500 bytes) of the packet size and send buffer based on a guaranteed minimum (e.g., 1024 bytes). After the discovery of the PMTU, the computing devices may simply update these buffers based on the discovered PMTU without any other disruption.

The computing devices may also perform PMTU discovery for multiple paths in between. For example, multiple paths through a software defined wide area network (SD-WAN) may be visible to the computing devices, and the computing devices may execute the PMTU discovery methods or techniques for the paths. In addition to the PMTUs, the computing devices may determine other network parameters such as throughput, latency, and loss percentage. The computing devices may select a performance optimal path for different types of data based the corresponding PMTU and the determined other network parameters. For example, the computing devices may select a path with a lower PMTU and a lower latency for interactive data and a path with a higher PMTU and a higher latency for bulk data. Furthermore, when the network conditions change, the computing devices may dynamically recalculate the PMTUs and/or the other network parameters and update the transmission strategy accordingly.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes only and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client computer 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

The components 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
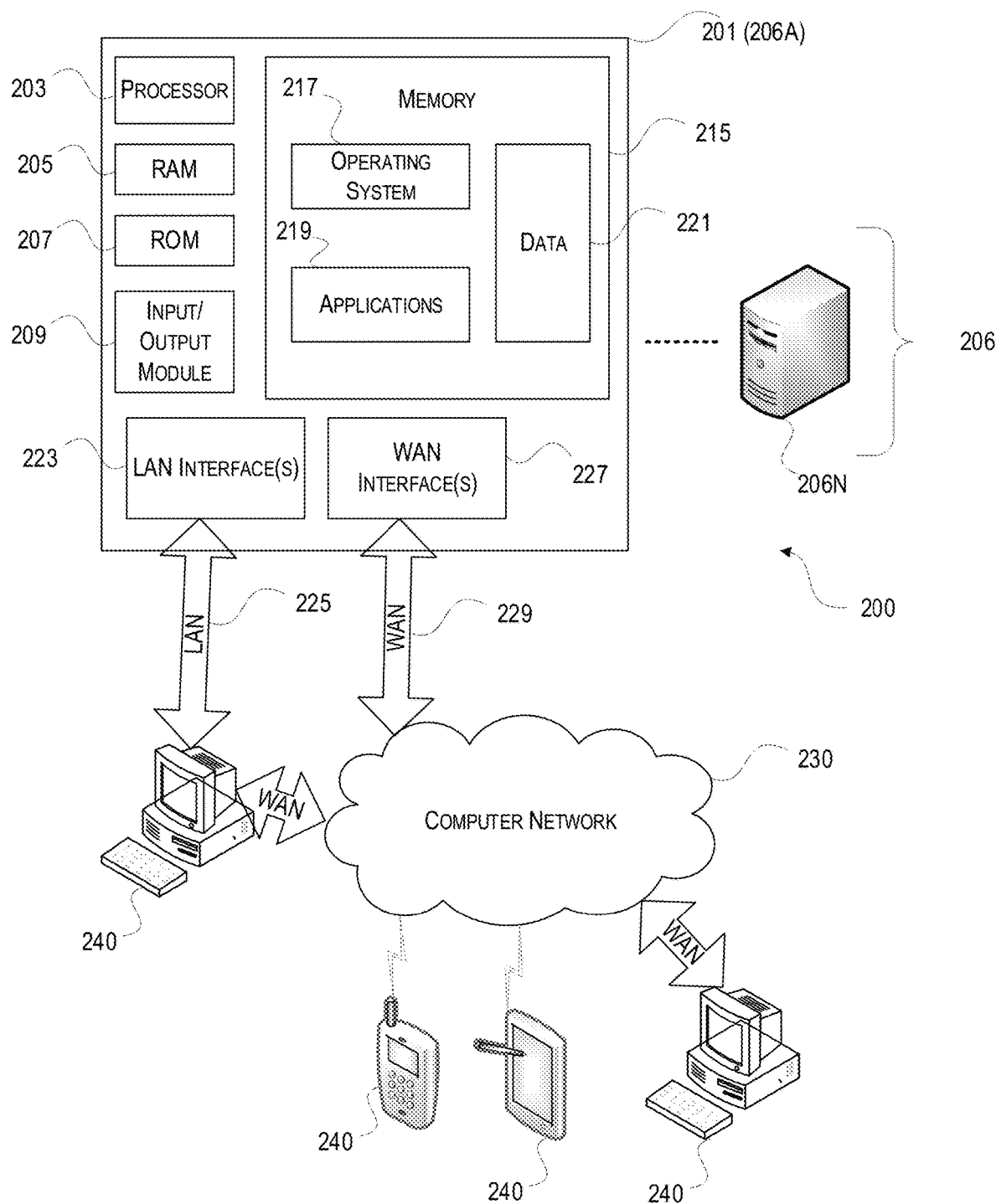
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client device 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
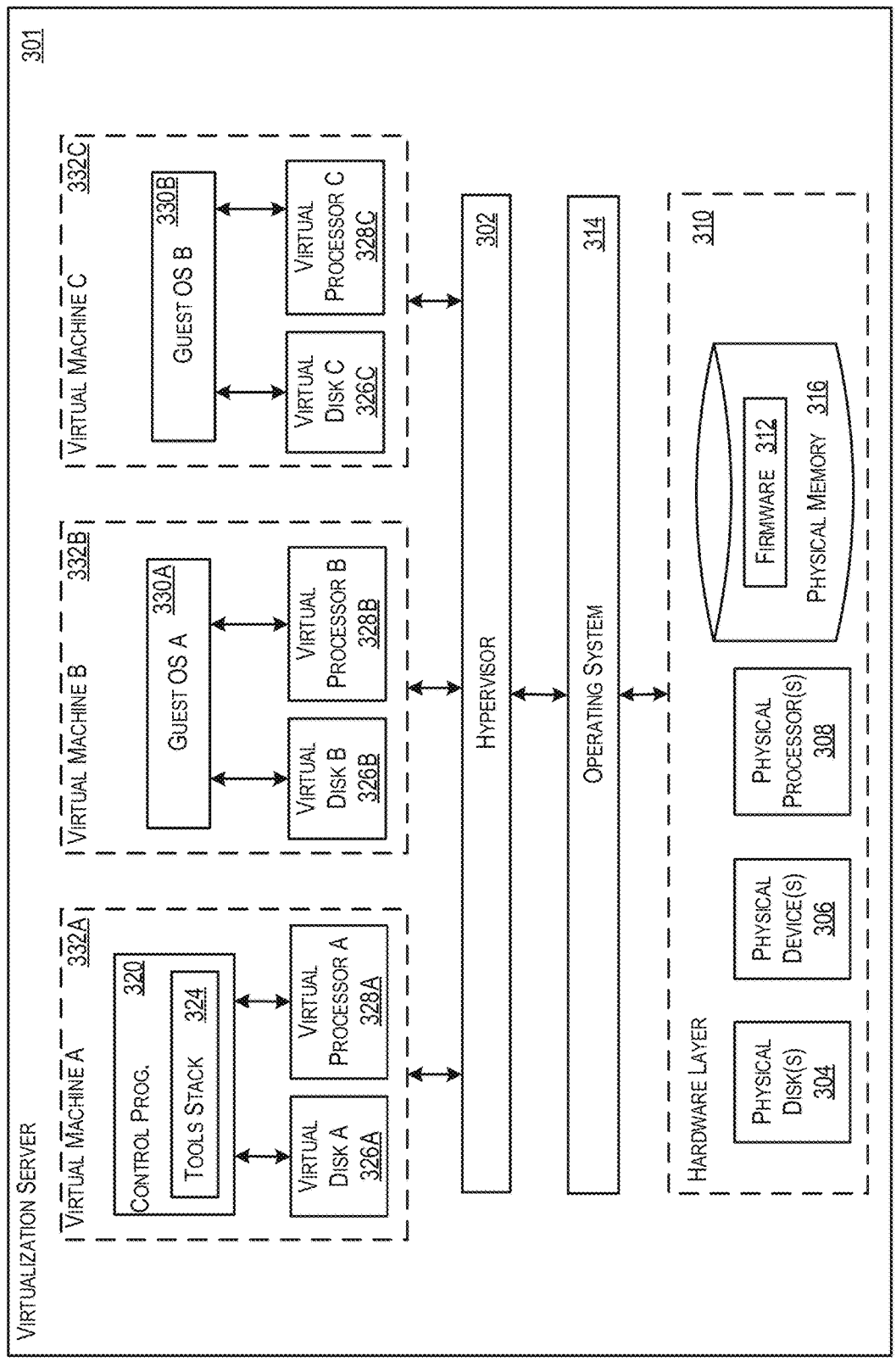
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. An instance of the operating system may be physical (e.g., one operating system per device) or virtual (e.g., many instances of an OS running on a single device). An application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). A virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332.

In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide the virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide the virtual machine 332 with a substantially similar virtual view of the physical hardware, memory, processor, and other system resources available to the virtual machines 332.

The virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides the virtual machine 332 with a unique view of the physical disks 304. Thus, in these embodiments, the particular virtual disk 326 included in the virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
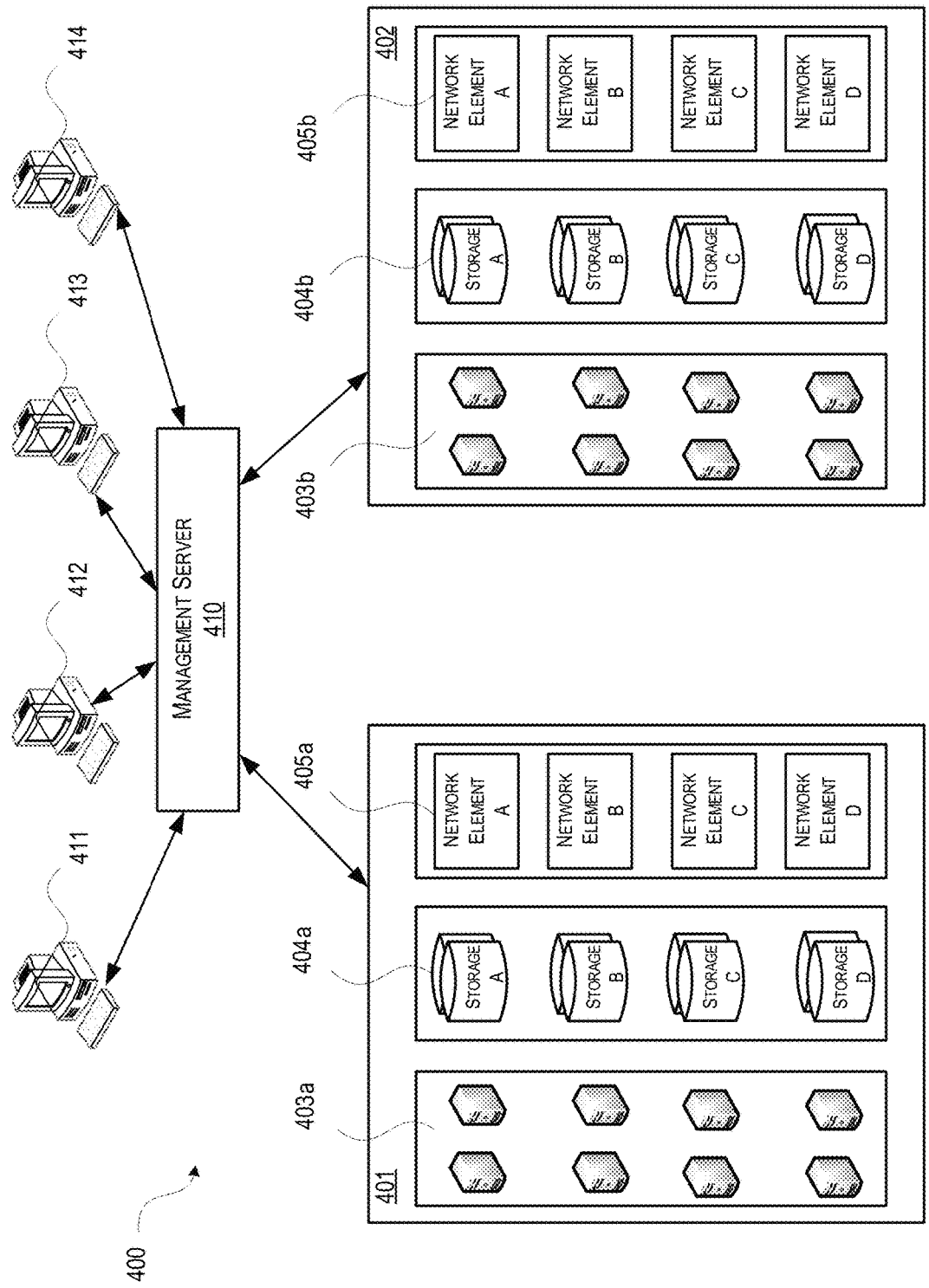
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. A zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, the zones 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 5A:
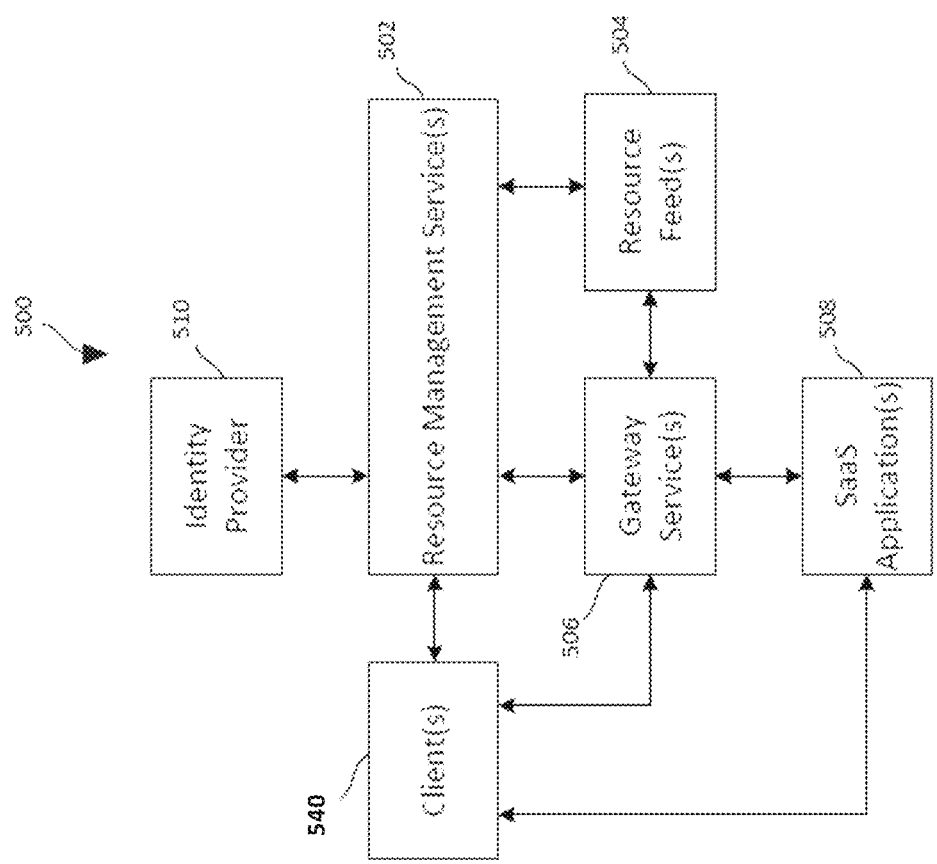
FIG. 5A depicts a block diagram of an example system in which resource management services may manage and streamline access by clients to resource feeds (via one or more gateway services) and/or software-as-a-service (SaaS) applications.

FIG. 5A is a block diagram of an example multi-resource access system 500 in which one or more resource management services 502 may manage and streamline access by one or more clients 540 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 540 and, following authentication, identify one of more resources the user is authorized to access. In response to the user selecting one of the identified resources, the resource management service(s) 502 may send appropriate access credentials to the requesting client 540, and the client 540 may then use those credentials to access the selected resource. For the resource feed(s) 504, the client 540 may use the supplied credentials to access the selected resource via a gateway service 506. For the SaaS application(s) 508, the client 540 may use the credentials to access the selected application directly.

The client(s) 540 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 540, one or more file repositories and/or file sharing systems, one or more secure browser services, one or more access control services for the SaaS applications 508, one or more management services for local applications on the client(s) 540, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
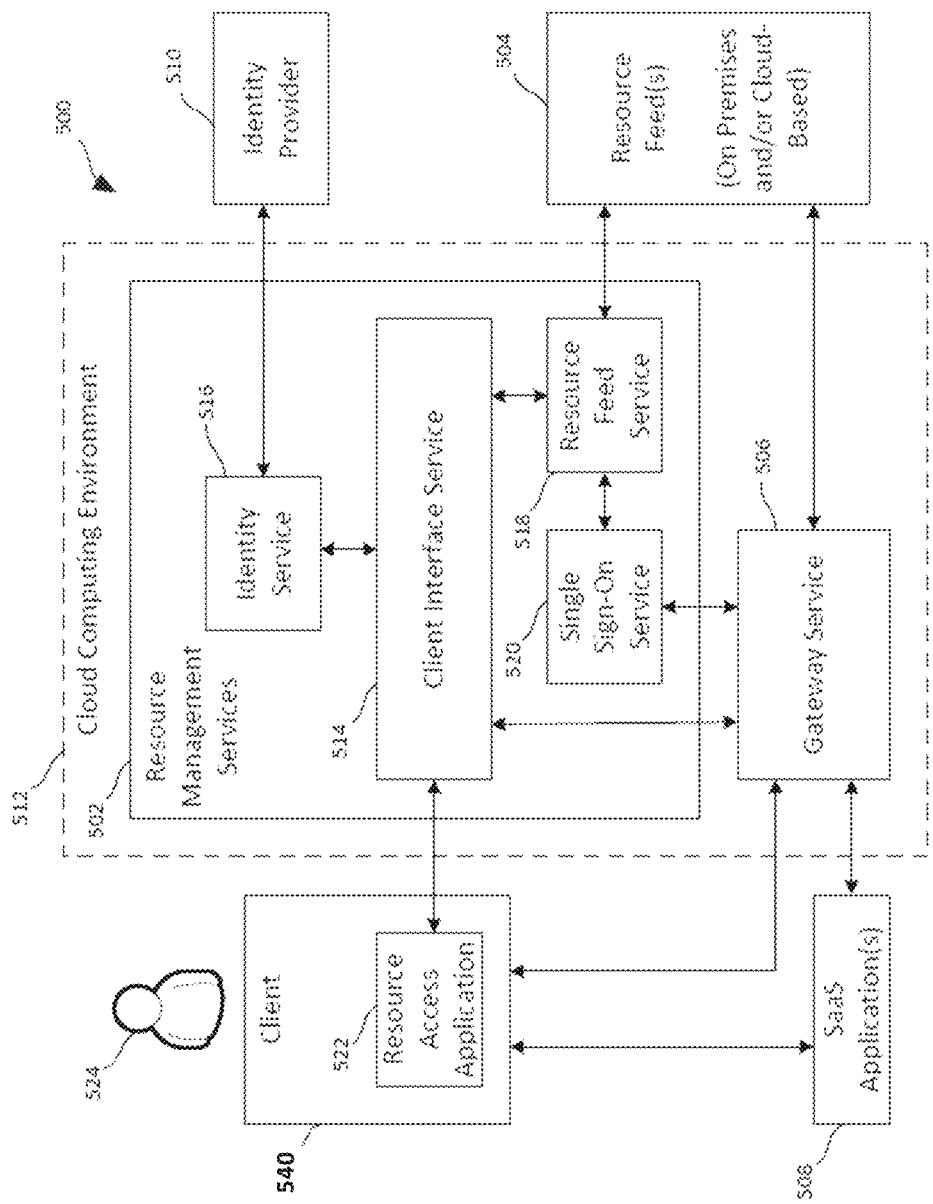
FIG. 5B depicts a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 540) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 540 may use a resource access application 522 to communicate with the client interface service 514 as well as to present a user interface on the client 540 that a user 524 can operate to access the resource feed(s) 504 and/or the SaaS application(s) 508. The resource access application 522 may either be installed on the client 540, or may be executed by the client interface service 514 (or elsewhere in the multi-resource access system 500) and accessed using a web browser (not shown in FIG. 5B) on the client 540.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 540 to be redirected to the cloud-based identity service to complete an authentication process. The cloud-based identity service may then cause the client 540 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 540. The list of available resources may, for example, be presented on the user interface of the client 540 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 540, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 540 may proceed to access the selected resource.

When the user 524 selects a local application, the resource access application 522 may cause the selected local application to launch on the client 540. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 540 may then launch the identified browser and initiate a connection to the gateway service 506. The gateway service 506 may then request an assertion from the single sign-on service 520. Upon receiving the assertion, the gateway service 506 may cause the identified browser on the client 540 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 540 to access the selected SaaS application 508.

In some embodiments, the preferred browser identified by the gateway service 506 may be a specialized browser embedded in the resource access application 522 (when the resource access application 522 is installed on the client 540) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 540 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 540, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 540 to notify a user 524 of something that requires the user's attention (e.g., approval of an expense report, new course available for registration, etc.).

Figure 5C:
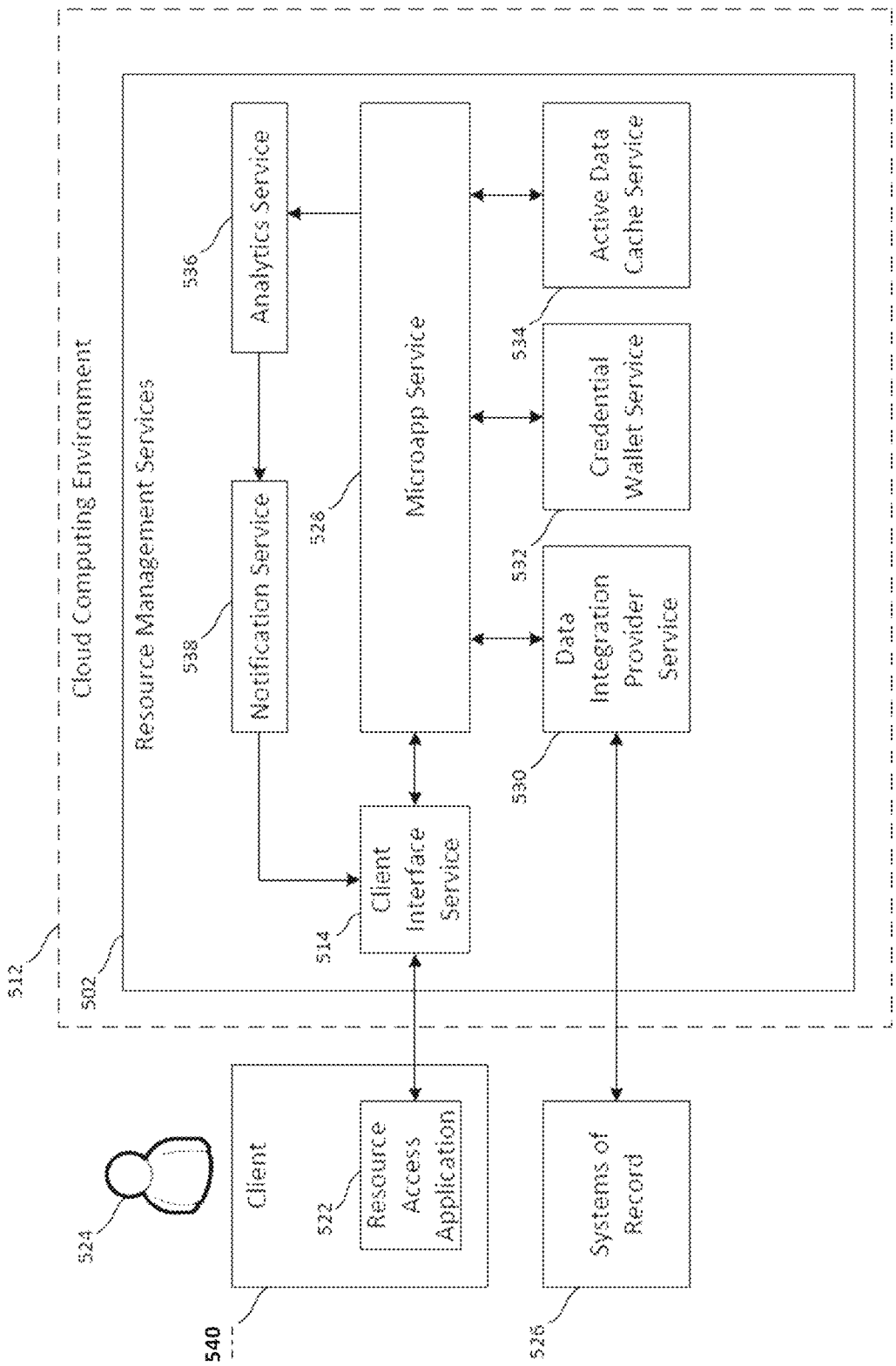
FIG. 5C depicts a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 540. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6 ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically cause active data to be pulled from the systems of record 526.

In some embodiments, the active data cache service 534 may be single-tenant and may store all configuration information and microapp data. It may, for example, utilize a pertinent database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

In some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 540 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 540 as a push notification to the user 524.

In some embodiments, a process for processing a user-initiated action via a microapp may operate as follows. The client 540 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Enterprise Mobility Management Architecture

Figure 6A:
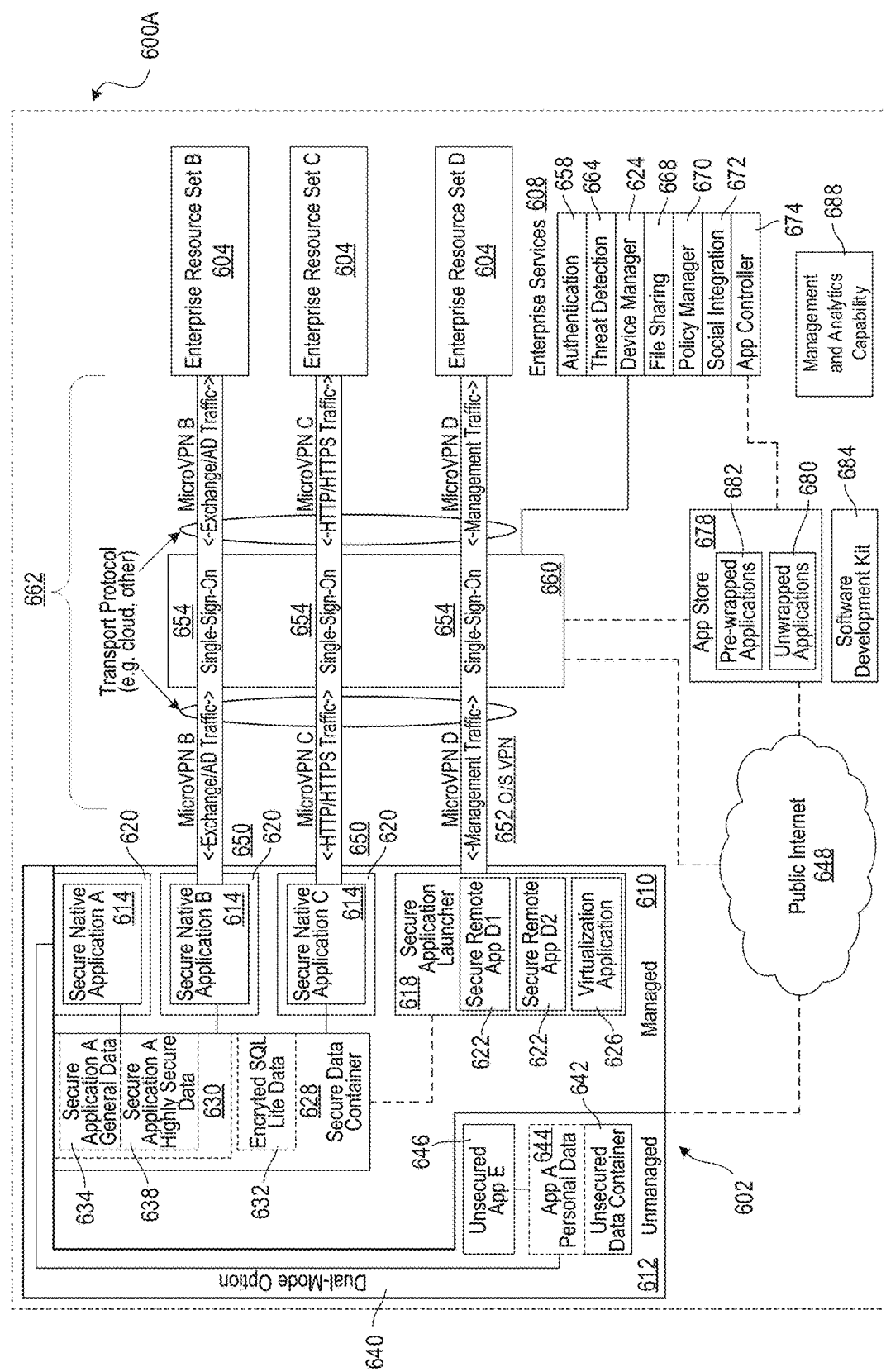
FIG. 6A depicts an illustrative enterprise mobility management system.

FIG. 6A represents an enterprise mobility technical architecture 600A for use in a "Bring Your Own Device" (BYOD) environment. The architecture enables a user of a mobile device 602 to both access enterprise or personal resources from a mobile device 602 and use the mobile device 602 for personal use. The user may access such enterprise resources 604 or enterprise services 608 using a mobile device 602 that is purchased by the user or a mobile device 602 that is provided by the enterprise to the user. The user may utilize the mobile device 602 for business use only or for business and personal use. The mobile device 602 may run an iOS operating system, an Android operating system, or the like.

The enterprise may choose to implement policies to manage the mobile device 602. The policies may be implemented through a firewall or gateway in such a way that the mobile device 602 may be identified, secured or security verified, and provided selective or full access to the enterprise resources (e.g., 604 and 608.) The policies may be mobile device management policies, mobile application management policies, mobile data management policies, or some combination of mobile device, application, and data management policies. A mobile device 602 that is managed through the application of mobile device management policies may be referred to as an enrolled device.

In some embodiments, the operating system of the mobile device 602 may be separated into a managed partition 610 and an unmanaged partition 612. The managed partition 610 may have policies applied to it to secure the applications running on and data stored in the managed partition 610. The applications running on the managed partition 610 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 602. By operating in accordance with their respective policy file(s), an application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 614, secure remote applications 622 executed by a secure application launcher 618, virtualization applications 626 executed by a secure application launcher 618, and the like. The secure native applications 614 may be wrapped by a secure application wrapper 620. The secure application wrapper 620 may include integrated policies that are executed on the mobile device 602 when the secure native application 614 is executed on the mobile device 602. The secure application wrapper 620 may include meta-data that points the secure native application 614 running on the mobile device 602 to the resources hosted at the enterprise (e.g., 604 and 608) that the secure native application 614 may require to complete the task requested upon execution of the secure native application 614. The secure remote applications 622 executed by a secure application launcher 618 may be executed within the secure application launcher 618. The virtualization applications 626 executed by a secure application launcher 618 may utilize resources on the mobile device 602, at the enterprise resources 604, and the like. The resources used on the mobile device 602 by the virtualization applications 626 executed by a secure application launcher 618 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 604, and the like. The resources used at the enterprise resources 604 by the virtualization applications 626 executed by a secure application launcher 618 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 626 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 602, this arrangement may also be elected for certain applications. For example, while some applications may be secured for use on the mobile device 602, others might not be prepared or appropriate for deployment on the mobile device 602 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 602 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 602 as well as a virtualization application 626 to allow access to applications that are deemed more properly operated on the server side. In an embodiment, the virtualization application 626 may store some data, files, etc. on the mobile device 602 in one of the secure storage locations. An enterprise, for example, may elect to allow certain information to be stored on the mobile device 602 while not permitting other information.

In connection with the virtualization application 626, as described herein, the mobile device 602 may have a virtualization application 626 that is designed to present GUIs and then record user interactions with the GUI. The virtualization application 626 may communicate the user interactions to the server side to be used by the server side application as user interactions with the application. In response, the application on the server side may transmit back to the mobile device 602 a new GUI. For example, the new GUI may be a static page, a dynamic page, an animation, or the like, thereby providing access to remotely located resources.

The secure applications 614 may access data stored in a secure data container 628 in the managed partition 610 of the mobile device 602. The data secured in the secure data container may be accessed by the secure native applications 614, secure remote applications 622 executed by a secure application launcher 618, virtualization applications 626 executed by a secure application launcher 618, and the like. The data stored in the secure data container 628 may include files, databases, and the like. The data stored in the secure data container 628 may include data restricted to a specific secure application 630, shared among secure applications 632, and the like. Data restricted to a secure application may include secure general data 634 and highly secure data 638. Secure general data may use a strong form of encryption such as Advanced Encryption Standard (AES) 128-bit encryption or the like, while highly secure data 638 may use a very strong form of encryption such as AES 256-bit encryption. Data stored in the secure data container 628 may be deleted from the mobile device 602 upon receipt of a command from the device manager 624. The secure applications (e.g., 614, 622, and 626) may have a dual-mode option 640. The dual mode option 640 may present the user with an option to operate the secured application in an unsecured or unmanaged mode. In an unsecured or unmanaged mode, the secure applications may access data stored in an unsecured data container 642 on the unmanaged partition 612 of the mobile device 602. The data stored in an unsecured data container may be personal data 644. The data stored in an unsecured data container 642 may also be accessed by unsecured applications 646 that are running on the unmanaged partition 612 of the mobile device 602. The data stored in an unsecured data container 642 may remain on the mobile device 602 when the data stored in the secure data container 628 is deleted from the mobile device 602. An enterprise may want to delete from the mobile device 602 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 602 may connect to enterprise resources 604 and enterprise services 608 at an enterprise, to the public Internet 648, and the like. The mobile device 602 may connect to enterprise resources 604 and enterprise services 608 through virtual private network connections. The virtual private network connections, also referred to as microVPN or application-specific VPN, may be specific to particular applications (as illustrated by microVPNs 650, particular devices, particular secured areas on the mobile device (as illustrated by O/S VPN 652), and the like. For example, the wrapped applications in the secured area of the mobile device 602 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 654. The single-sign-on processes may allow a user to provide a single set of authentication credentials, which are then verified by an authentication service 658. The authentication service 658 may then grant to the user access to multiple enterprise resources 604, without requiring the user to provide authentication credentials to an individual enterprise resource 604.

The virtual private network connections may be established and managed by an access gateway 660. The access gateway 660 may include performance enhancement features that manage, accelerate, and improve the delivery of enterprise resources 604 to the mobile device 602. The access gateway 660 may also re-route traffic from the mobile device 602 to the public Internet 648, enabling the mobile device 602 to access publicly available and unsecured applications that run on the public Internet 648. The mobile device 602 may connect to the access gateway via a transport network 662. The transport network 662 may use one or more transport protocols and may be a wired network, wireless network, cloud network, local area network, metropolitan area network, wide area network, public network, private network, and the like.

The enterprise resources 604 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 604 may be premise-based resources, cloud-based resources, and the like. The enterprise resources 604 may be accessed by the mobile device 602 directly or through the access gateway 660. The enterprise resources 604 may be accessed by the mobile device 602 via the transport network 662.

The enterprise services 608 may include authentication services 658, threat detection services 664, device manager services 624, file sharing services 668, policy manager services 670, social integration services 672, application controller services 674, and the like. Authentication services 658 may include user authentication services, device authentication services, application authentication services, data authentication services, and the like. Authentication services 658 may use certificates. The certificates may be stored on the mobile device 602, by the enterprise resources 604, and the like. The certificates stored on the mobile device 602 may be stored in an encrypted location on the mobile device 602, the certificate may be temporarily stored on the mobile device 602 for use at the time of authentication, and the like. Threat detection services 664 may include intrusion detection services, unauthorized access attempt detection services, and the like. Unauthorized access attempt detection services may include unauthorized attempts to access devices, applications, data, and the like. Device management services 624 may include configuration, provisioning, security, support, monitoring, reporting, and decommissioning services. File sharing services 668 may include file management services, file storage services, file collaboration services, and the like. Policy manager services 670 may include device policy manager services, application policy manager services, data policy manager services, and the like. Social integration services 672 may include contact integration services, collaboration services, integration with social networks such as Facebook, Twitter, and LinkedIn, and the like. Application controller services 674 may include management services, provisioning services, deployment services, assignment services, revocation services, wrapping services, and the like.

The enterprise mobility technical architecture 600A may include an application store 678. The application store 678 may include unwrapped applications 680, pre-wrapped applications 682, and the like. Applications may be populated in the application store 678 from the application controller 674. The application store 678 may be accessed by the mobile device 602 through the access gateway 660, through the public Internet 648, or the like. The application store 678 may be provided with an intuitive and easy to use user interface.

A software development kit 684 may provide a user the capability to secure applications selected by the user by wrapping the application as described previously in this description. An application that has been wrapped using the software development kit 684 may then be made available to the mobile device 602 by populating it in the application store 678 using the application controller 674.

The enterprise mobility technical architecture 600A may include a management and analytics capability 688. The management and analytics capability 688 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6B:
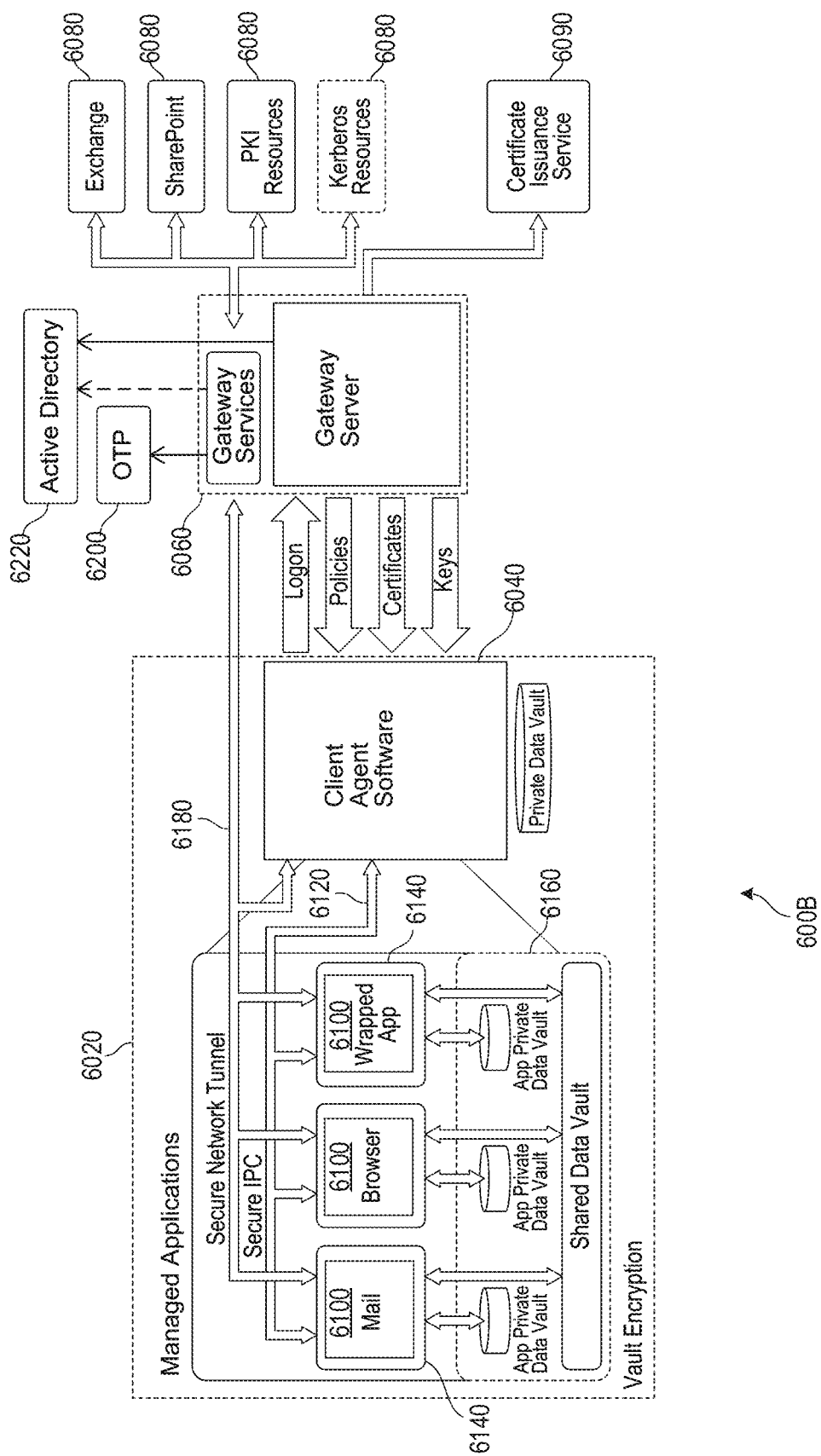
FIG. 6B depicts another illustrative enterprise mobility management system.

FIG. 6B is another illustrative enterprise mobility management system 600B. Some of the components of the mobility management system 600A described above with reference to FIG. 6A have been omitted for the sake of simplicity. The architecture of the system 600B depicted in FIG. 6B is similar in many respects to the architecture of the system 600A described above with reference to FIG. 6A and may include additional features not mentioned above.

In this case, the left hand side represents an enrolled mobile device 6020 with a client agent 6040, which interacts with gateway server 6060 (which includes Access Gateway and application controller functionality) to access various enterprise resources 6080 and services 6090 such as Exchange, Sharepoint, public-key infrastructure (PKI) Resources, Kerberos Resources, Certificate Issuance service, as shown on the right hand side above. Although not specifically shown, the mobile device 6020 may also interact with an enterprise application store (StoreFront) for the selection and downloading of applications.

The client agent 6040 acts as the UI (user interface) intermediary for Windows apps/desktops hosted in an Enterprise data center, which are accessed using the High-Definition User Experience (HDX)/ICA display remoting protocol. The client agent 6040 also supports the installation and management of native applications on the mobile device 6020, such as native iOS or Android applications. For example, the managed applications 6100 (mail, browser, wrapped application) shown in the figure above are all native applications that execute locally on the mobile device 6020. Client agent 6040 and application management framework of this architecture act to provide policy driven management capabilities and features such as connectivity and SSO (single sign on) to enterprise resources/services 6080. The client agent 6040 handles primary user authentication to the enterprise, normally to Access Gateway (AG) 6060 with SSO to other gateway server components. The client agent 6040 obtains policies from gateway server 6060 to control the behavior of the managed applications 6100 on the mobile device 6020.

The Secure InterProcess Communication (IPC) links 6120 between the native applications 6100 and client agent 6040 represent a management channel, which may allow a client agent to supply policies to be enforced by the application management framework 6140 "wrapping" an application. The IPC channel 6120 may also allow client agent 6040 to supply credential and authentication information that enables connectivity and SSO to enterprise resources 6080. Finally, the IPC channel 6120 may allow the application management framework 6140 to invoke user interface functions implemented by client agent 6040, such as online and offline authentication.

Communications between the client agent 6040 and gateway server 6060 are essentially an extension of the management channel from the application management framework 6140 wrapping a native managed application 6100. The application management framework 6140 may request policy information from client agent 6040, which in turn may request it from gateway server 6060. The application management framework 6140 may request authentication, and client agent 6040 may log into the gateway services part of gateway server 6060 (for example, Citrix Gateway). Client agent 6040 may also call supporting services on gateway server 6060, which may produce input material to derive encryption keys for the local data vaults 6160, or may provide client certificates which may enable direct authentication to PKI protected resources, as more fully explained below.

In more detail, the application management framework 6140 "wraps" each managed application 6100. This may be incorporated via an explicit build step, or via a post-build processing step. The application management framework 6140 may "pair" with client agent 6040 on first launch of an application 6100 to initialize the Secure IPC channel 6120 and obtain the policy for that application. The application management framework 6140 may enforce relevant portions of the policy that apply locally, such as the client agent login dependencies and some of the containment policies that restrict how local OS services may be used, or how they may interact with the managed application 6100.

The application management framework 6140 may use services provided by client agent 6040 over the Secure IPC channel 6120 to facilitate authentication and internal network access. Key management for the private and shared data vaults 6160 (containers) may be also managed by appropriate interactions between the managed applications 6100 and client agent 6040. Vaults 6160 may be available only after online authentication, or may be made available after offline authentication if allowed by policy. First use of vaults 6160 may require online authentication, and offline access may be limited to at most the policy refresh period before online authentication is again required.

Network access to internal resources may occur directly from individual managed applications 6100 through Access Gateway 6060. The application management framework 6140 may be responsible for orchestrating the network access on behalf of a managed application 6100. Client agent 6040 may facilitate these network connections by providing suitable time limited secondary credentials obtained following online authentication. Multiple modes of network connection may be used, such as reverse web proxy connections and end-to-end VPN-style tunnels 6180.

The Mail and Browser managed applications 6100 have special status and may make use of facilities that might not be generally available to arbitrary wrapped applications. For example, the Mail application 6100 may use a special background network access mechanism that allows it to access an Exchange server 6080 over an extended period of time without requiring a full AG logon. The Browser application 6100 may use multiple private data vaults 6160 to segregate different kinds of data.

This architecture may support the incorporation of various other security features. For example, gateway server 6060 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 6060 may identify managed native applications 6100 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 6160 (containers) on the mobile device 6020. The vaults 6160 may be encrypted so that all on-device data including files, databases, and configurations are protected. For on-line vaults, the keys may be stored on the server (gateway server 6060), and for off-line vaults, a local copy of the keys may be protected by a user password or biometric validation. If or when data is stored locally on the mobile device 6020 in the secure container 6160, it may be preferred that a minimum of AES 256 encryption algorithm be utilized.

Other secure container features may also be implemented. For example, a logging feature may be included, wherein security events happening inside a managed application 6100 may be logged and reported to the backend. Data wiping may be supported, such as if or when the managed application 6100 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 6020 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 6140 may be prevented in other ways. For example, if or when a managed application 6100 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 6200 without the use of an AD (active directory) 6220 password for access to one or more applications. In some cases, some users do not know (or are not permitted to know) their AD password, so these users may authenticate using an OTP 6200 such as by using a hardware OTP system like SecurID (OTPs may be provided by different vendors also, such as Entrust or Gemalto). In some cases, after a user authenticates with a user ID, a text may be sent to the user with an OTP 6200. In some cases, this may be implemented only for online use, with a prompt being a single field.

An offline password may be implemented for offline authentication for those managed applications 6100 for which offline use is permitted via enterprise policy. For example, an enterprise may want StoreFront to be accessed in this manner In this case, the client agent 6040 may require the user to set a custom offline password and the AD password is not used. Gateway server 6060 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 6100 as secondary credentials (for the purpose of accessing PKI protected web resources via the application management framework micro VPN feature). For example, a managed application 6100 may utilize such a certificate. In this case, certificate-based authentication using ActiveSync protocol may be supported, wherein a certificate from the client agent 6040 may be retrieved by gateway server 6060 and used in a keychain. A managed application 6100 may have one associated client certificate, identified by a label that is defined in gateway server 6060.

Gateway server 6060 may interact with an enterprise special purpose web service to support the issuance of client certificates to allow relevant managed applications to authenticate to internal PKI protected resources.

The client agent 6040 and the application management framework 6140 may be enhanced to support obtaining and using client certificates for authentication to internal PKI protected network resources. More than one certificate may be supported, such as to match various levels of security and/or separation requirements. The certificates may be used by the Mail and Browser managed applications 6100, and ultimately by arbitrary wrapped applications 6100 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in a managed application 6100 for a period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 6020 is authenticated to the enterprise, and vice versa. Virtual smart cards for authentication to gateway server 6060 may also be implemented.

Another feature may relate to application container locking and wiping, which may automatically occur upon jailbreak or rooting detections, and occur as a pushed command from administration console, and may include a remote wipe functionality even when a managed application 6100 is not running.

A multi-site architecture or configuration of enterprise application store and an application controller may be supported that allows users to be serviced from one of several different locations in case of failure.

In some cases, managed applications 6100 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Dynamic PMTU Discovery and Adjustment

Figure 7A:
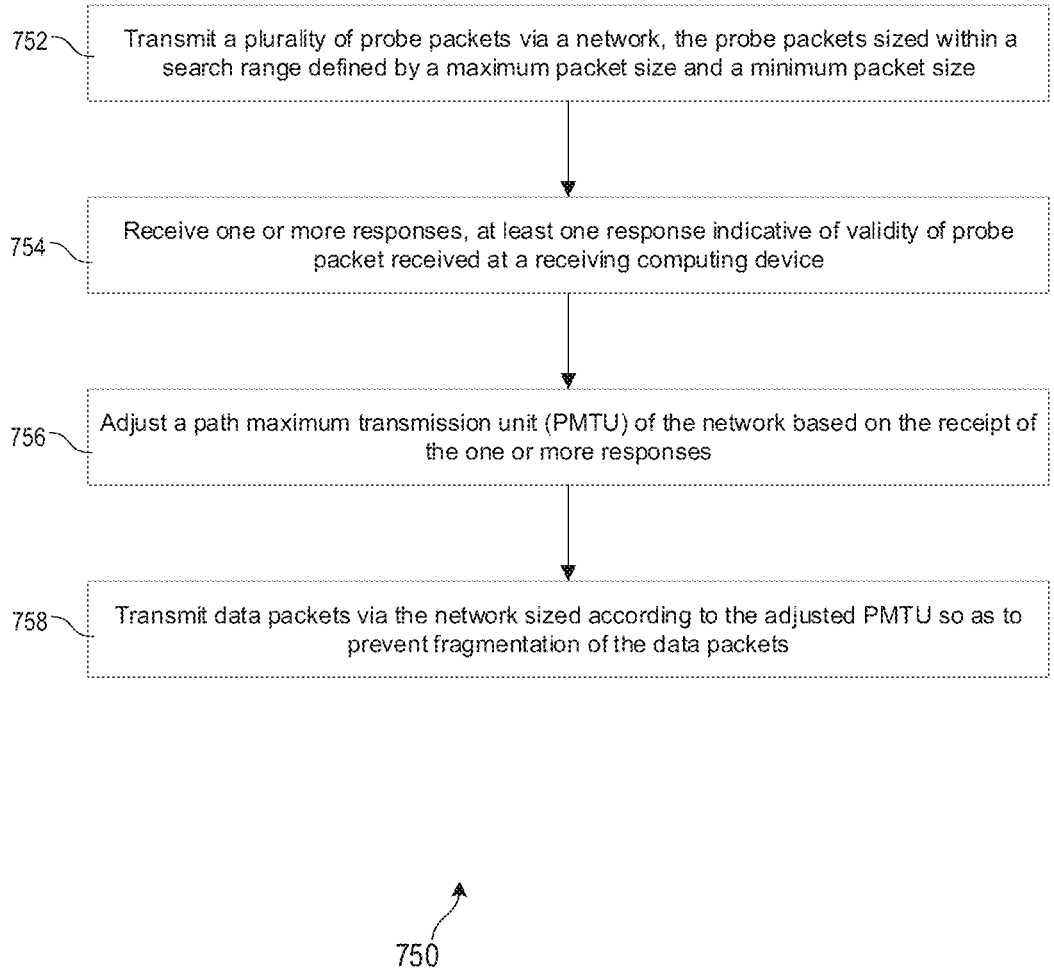
FIG. 7A depicts an illustrative method of PMTU discovery.

FIG. 7A depicts a flow chart of an illustrative method 750 of the PMTU discovery. The steps of the illustrative method 750 may be performed by multiple computing devices, however, the following describes for brevity, a sending computing device (e.g., a client 240, client computers 411-414, client 540, mobile device 602, and/or mobile device 6020) performing the steps of the method 750 in communication with a receiving computing device (e.g., computing device 201, virtualization server 301, management server 401, one or more servers in the cloud computing environment 512, and/or enterprise resources 604). It should however be understood that the sending computing device being on the client side and the receiving computing device being on the server is merely an example and should not be considered limiting. The sending computing device may be on the server side ((e.g., computing device 201, virtualization server 301, management server 401, one or more servers in the cloud computing environment 512, and/or enterprise resources 604) and the receiving computing device may be on the client side (e.g., a client 240, client computers 411-414, client 540, mobile device 602, and/or mobile device 6020).

In step 752, the sending computing device may transmit a plurality of probe packets via a network. The sending computing device may size the probe packets to be within a search range defined by a maximum packet size and a minimum packet size. The search range may indicate staggered packet sizes for the sending computing device to probe the network for successful transmissions. In step 754, the sending computing device may receive one or more responses. At least one of the responses may indicate validity of packet received at the receiving computing device. The one or more responses may therefore indicate whether the corresponding probe packets were validly received at the receiving computing device.

In step 756, the sending computing device may adjust a PMTU of the network based on the receipt of the one or more responses. The one or more responses may indicate to the sending computing device which of the probe packets were validly received at the receiving computing device. In an example, the sending computing device may adjust the PMTU to a size of the largest probe packet at the receiving computing device. In step 758, the sending computing device may transmit data packets via the network and sized according to the adjusted PMTU. Such sizing, for example, to be within the PMTU may prevent fragmentation of the data packets during their transmission because the data packets are sized according to a past successful packet transmission through the network.

Figure 7B:
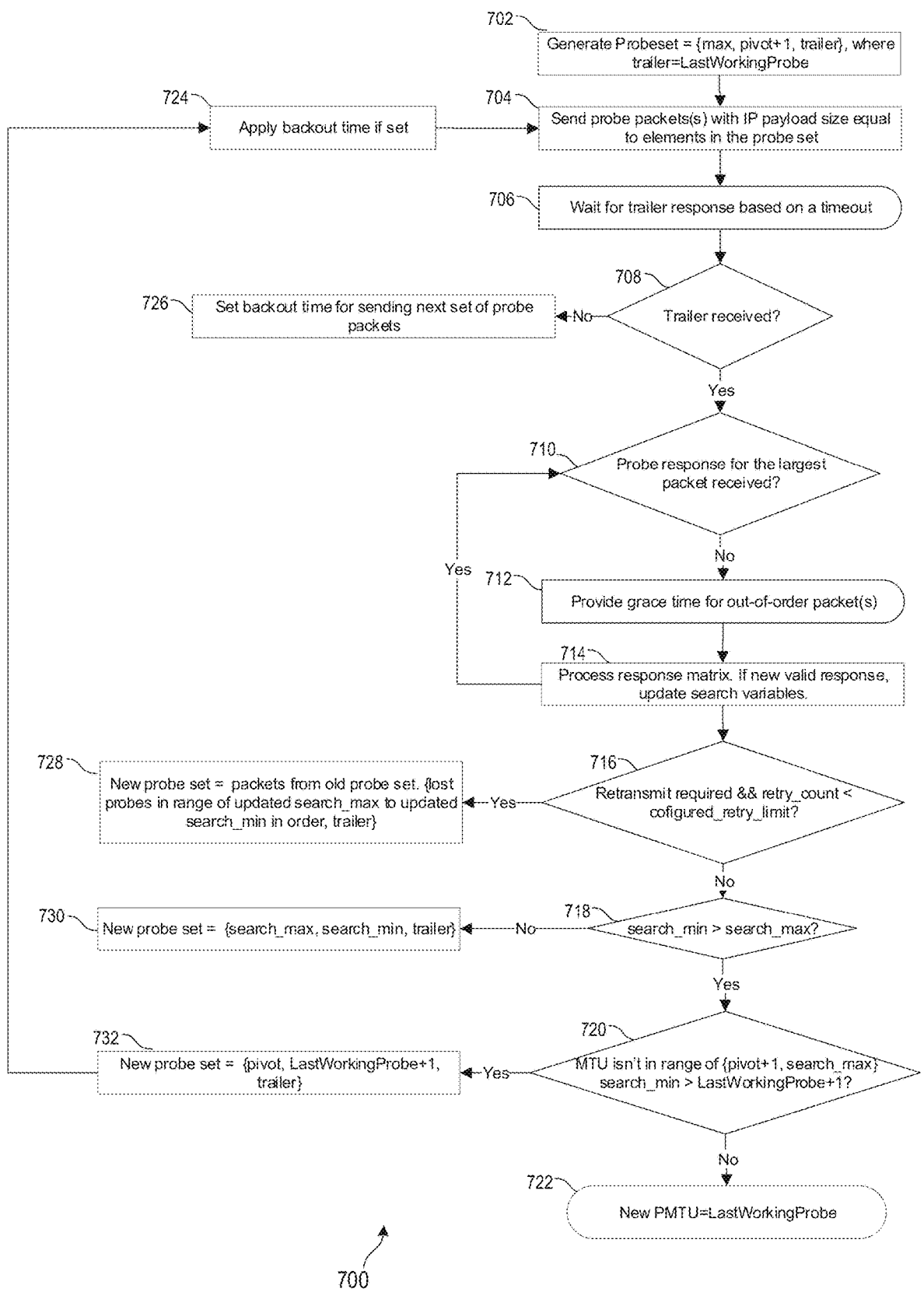
FIG. 7B depicts an illustrative method executed by a sender thread during a PMTU discovery.

FIG. 7B depicts a flow chart of an illustrative method 700 of PMTU discovery. A sending computing device (e.g., a client 240 client computers 411-414, client 540, mobile device 602, and/or mobile device 6020) may discover the PMTU by iteratively transmitting multiple bursts of probe packets to a receiving computing device (e.g. computing device 201, virtualization server 301, management server 401, one or more servers in the cloud computing environment 512, and/or enterprise resources 604) via a path (e.g., computer network 230) and monitoring which probe packets are validly received. It should however be understood that the sending computing device being on the client side and the receiving computing device being on the server is merely an example and should not be considered limiting. The sending computing device may be on the server side ((e.g., computing device 201, virtualization server 301, management server 401, one or more servers in the cloud computing environment 512, and/or enterprise resources 604) and the receiving computing device may be on the client side (e.g., a client 240, client computers 411-414, client 540, mobile device 602, and/or mobile device 6020).

The sending computing device may monitor which packets are validly received in the previous iteration to generate probe packets for a current iteration. The sending computing device may perform multiple iterations until the PMTU discovery process converges (e.g., narrows down to) on the PMTU that can be supported by the path. Although the steps of the method 700 can be performed by multiple computing devices, the following describes a sending computing device in communication with a receiving computing device performing all the steps of the method. In particular, the sending computing device may execute a sender thread to perform the steps of the method 700.

In step 702, the sending computing device may generate a probe set for the current iteration of PMTU discovery. The sending computing device may use the probe set to size the probe packets for the current iteration. For example, the probe set may indicate a size range (in the example shown in FIG. 7B, probe set={max, pivot+1, trailer}) for probe packets to be sent to the receiving computing device through a path in the current iteration. For the size range, probe set may indicate a maximum possible packet size that may be supported by the path (e.g., 1500 bytes, minimum of the maximum packet sizes supported by the components within the path, or any other maximum packet size). As the current iteration may be a first iteration (the step 702 being the initial step), the probe set may indicate the minimum packet size to be pivot+1 bytes. The pivot may be a last working PMTU for the path. This minimum may allow the sending computing device to determine if a higher PMTU than the last working PMTU (i.e., the pivot) may be supported by the path. In addition to a maximum probe packet and the minimum probe packet, the probe set may indicate the size of a trailer packet, which may be the size of the last working probe. The trailer packet may allow the sending computing device to detect network conditions as congestion or loss of packets, for example, due to stochastic interference because the sending computing device knows that the size of the trailer packet is within the PMTU, and the trailer packet not reaching the receiving computing device may indicate adverse network conditions other than a lower PMTU. In the current iteration, which may be the first iteration, the size of the trailer packet may be a configurable guaranteed starting point (e.g., the packet size that should have a successful transmission) based upon the network technology (e.g., minimum packet size supported by any path within the network). Alternatively, the trailer packet size in the current iteration may be the size of pivot packet (e.g., packet sized according to the last working PMTU) itself, the size of the pivot packet being the last working PMTU of the path.

Figure 9:
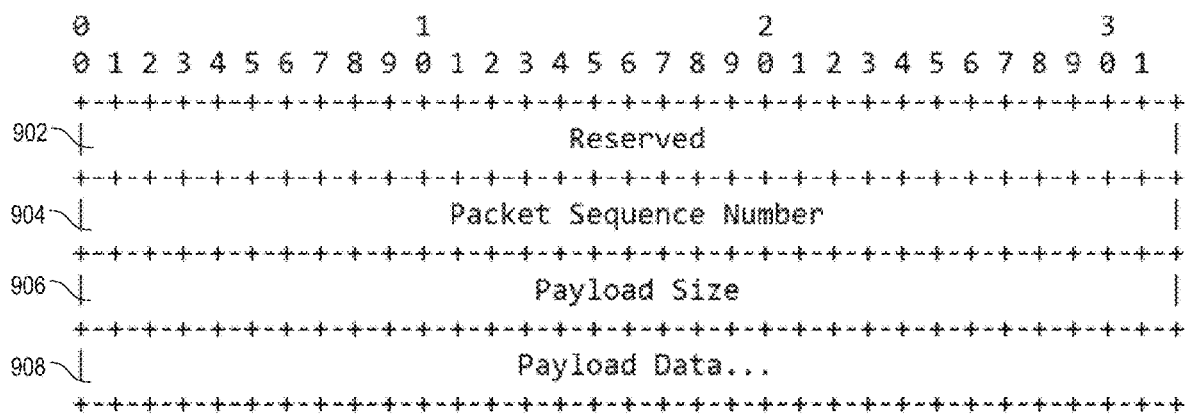
FIG. 9 depicts an illustrative probe packet.

In step 704, the sending computing device may generate and transmit probe packets (e.g., in a burst) to the receiving computing device according to the probe set generated in step 702. The sending computing device may generate the probe packets, wherein probe packets may have an internet protocol (IP) payload size equal to the elements of the probe set. An example probe packet 900 is shown in FIG. 9. As shown, the example probe packet 900 may include a plurality of fields 902, 904, 906, and 908. Field 902 may be reserved for one or more protocols for communication between the sending and receiving computing devices. Field 904 may indicate a packet sequence number. The initiator of PMTU discovery process (here the sending computing device) may set the sequence number for the probe packet to identify and track the probe packet. For example, the sending computing device may use the sequence numbers to identify the multiple probe packets in the plurality of iterations from the sending computing device to the receiving computing device. The sequence numbers may allow the sending computing device to determine which probe packets were received (e.g., probe packets with sequence numbers 1, 4, and 5 were received) and which probe packets were lost (e.g., probe packets with sequence numbers 2, 3, and 6 were lost). The packet sequence number indicated by the field 904 may be independent of the sequence numbers eventually (e.g., after the PMTU discovery process) used for data transmission between the sending and receiving computing devices. Field 906 may indicate payload size of the probe packet 900. The receiving computing device may utilize the field 906 to determine whether the receiving computing device validly received the packet, e.g., without a change in the payload size. The field 908 may include the payload data. The payload data may be random data of the size as specified in the payload size field 906.

A burst corresponding to an iteration may comprise multiple probe packets (e.g., with similar configuration as the example probe packet 900) generated according to the probe set of step 702. For example, the sending device may generate a burst of three packets for the current iteration: maximum size probe packet, pivot+1 probe packet, and the trailer packet. Within the burst, the sending computing device may transmit the probe packets with an equal inter-packet interval in which to transmit packets one after another. The inter-packet interval may be small (e.g., in order of milliseconds), however the small packet interval should not be considered limiting and an inter-packet time interval of any size should be considered within the scope of this disclosure. A burst may therefore generally refer to a plurality of probe packets that are sent in a rapid succession. The sending computing device may transmit the burst in an ascending order according to packet size (e.g., from the minimum size probe packet to the maximum size probe packet), in a descending order according to packet size (e.g., from maximum size probe packet to the minimum size probe packet), or in a random order. The sending computing device may transmit the probe packets in the random order as a security measure. This randomization may create a barrier for attackers. For example, an attacker may not be able to track, anticipate, and attack one or more succeeding probe packets based on the knowledge of current probe packet because the size of the current probe packet may not have a bearing on the random sizes of the one or more succeeding packets.

In step 706, the sending computing device may wait for the trailer response with a timeout. The trailer response may indicate whether the trailer packet was successfully received at the receiving computing device. The timeout period may be configurable based on the network, type of data to be exchanged through the path, the level of accuracy desired for the PMTU discovery process, and/or any another aspect of the PMTU discovery process. After the expiry of the timeout, the sending computing device may execute step 708. In step 708, the sending computing device may determine if the receiving computing device has received the trailer packet. This determination may be based upon a response received from the receiving computing device, wherein the response may indicate that the trailer was validly received at the receiving computing device. For example, the response may be an acknowledgement message back from the receiving computing device in response to a receipt of the trailer packet.

If the sending computing device determines that the trailer packet was received by the receiving computing device in step 708, the sending computing device may execute step 710 to determine if a response for the largest probe packet (the maximum probe packet in the burst) was received by the receiving computing device. This determination may be based on a response received from the receiving computing device, wherein the response may indicate that the maximum probe packet was received at the receiving computing device. For example, the response may be an acknowledgement message back from the receiving computing device in response to a receipt of the maximum probe packet.

However, if the sending computing device at step 708 determines that the trailer was not received by the receiving computing device, the sending computing device may execute step 726 to set a backout time for the next iteration to allow the network to recover. In other words, the backout time may allow a window for one or more adverse network conditions (as exemplified by a non-receipt of the trailer) to subside before sending the next set of probe packets.

Referring back to step 710, if the sending computing device determines that the largest probe packet was received (e.g., indicating that that the path can support a larger PMTU than the last working PMTU), the sending computing device may execute step 714 to process a response matrix for the probe packets. However, if the sending computing device determines that the response for the maximum probe packet was not received at the receiving computing device, the sending computing device may execute step 712. Executing step 712 may allow the sending computing device to provide a grace time for out of order probe packets. In other words, the receiving computing device may not have received some of the probe packets in the order they were sent from the sending computing device and the grace time may allow the sending computing device to receive corresponding acknowledgement of the probe packets that may be delayed in route. After waiting for the grace time in step 712, the sending computing device may execute step 714 to process a response matrix for the current burst of probe packets.

If the sending computing device receives the response to largest probe packet in step 710, the sending computing device may execute step 714 to process response matrix for the current iteration of burst without the grace time (i.e., without executing step 712). A response by the receiving computing device of the largest probe packet may indicate to the sending computing device that the current path between the sending and receiving computing devices may support a PMTU of at least size of the largest packet probe. Therefore, the sending computing device may directly move to processing the response matrix when the sending computing device determines that the largest probe packet has been received at the receiving computing device. However, if the largest probe packet has not been received at the receiving computing device, the sending computing device may provide the grace time for the probe packets, which may include the largest probe packet, and process the response matrix thereafter in step 714.

Figure 10:
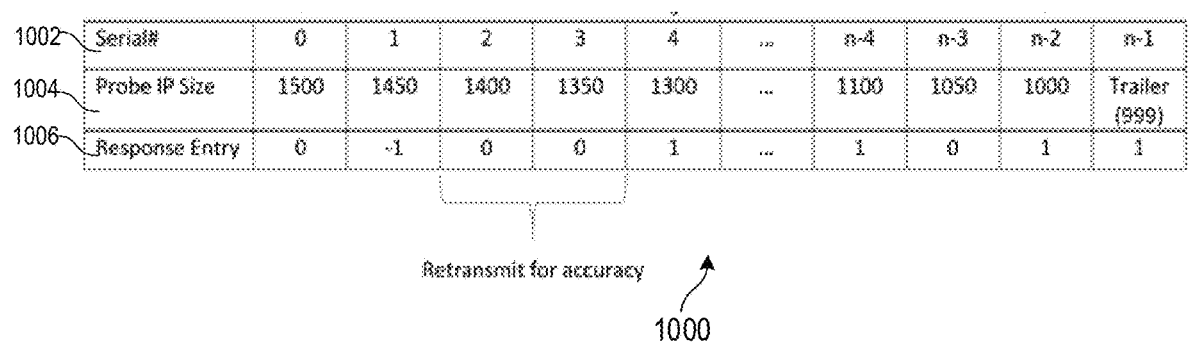
FIG. 10 depicts an illustrative response matrix.

The response matrix processed by the sending computing device in step 714 may indicate whether the probe packets were validly received at the receiving computing device. An example response matrix 1000 is shown in FIG. 10. As shown, the response matrix 1000 may include a serial number field 1002, a probe IP size field 1004, and a response entry field 1006. The serial number field 1002 may indicate the sequence number (e.g., as indicated by field 904 in FIG. 9) of the probe packets. For example, in a burst of n probe packets (including the trailer packet), an entry of serial number 0 may indicate the first probe packet in the burst, serial number 1 may indicate the second probe packet in the burst, and so on and so forth. The probe IP size field 1004 may indicate the size of the probe packet identified in the serial number field 1002. For example, as shown in FIG. 10, the size of the first probe packet (serial number 0) may be 1500 bytes, the size of the second probe packet (serial number 1) may be 1450 bytes, and the size of the $n^{th}$ probe packet (e.g., trailer packet with serial number n-1) may be 999 bytes. The response entry field 1006 may indicate whether the probe packet identified in the serial number field was validly received by the receiving computing device.

In the response matrix 1000, the response entry field 1006 may have values in the range of $\{-1, 0, 1\}$. An entry of $-1$ may indicate that the sending computing device received an invalid response from the receiving computing device for the corresponding probe packet. The invalid response may be acknowledgement message back from the receiving computing device confirming a receipt of the packet, but the acknowledgement message may not be as expected by the sending computing device. For example, the sending computing device may determine, based upon comparing the received acknowledgement with the expected response, that the probe packet was corrupted, truncated, and/or otherwise invalidly received at the receiving computing device. An entry of 0 may indicate that the sending computing device did not receive any response for the probe packet by the end of the current iteration. The entry of 0 may therefore indicate that the corresponding probe packet was lost or that the MTU threshold was reached. An entry of 1 may indicate that the sending computing device received a valid response from the receiving computing device before the end of the current iteration.

The response entry field 1006 of the trailer packet may indicate network characteristics such as network disruption. For example, an entry of $-1$ may indicate an unexpected corruption (e.g., not necessarily related to PMTU) and an entry of 0 may indicate a delay or a loss (e.g., not necessarily the MTU threshold being reached). If the entry is 0 or $-1$, the sending computing device may wait for a backout time before attempting to send the next burst of control packets (as described above with regard to step 726). An entry of 1 may indicate that the current iteration may have been completed and any network disruption is likely resolved and that the sending computing device may send the next burst (e.g., immediately thereafter).

The sending computing device may update search variables (e.g., generate a new probe set for the next iteration) in step 714. The sending computing device may perform the update in response to determining if a new valid response is received, e.g., a probe packet, larger than largest probe packet that was validly received in a previous iteration, is validly received at the current iteration. This valid receipt of the aforementioned larger probe packet may be used by the sending computing device to update the search variables with an even larger probe packet as the maximum size probe packet for the next iteration. The sending computing device may, based on the configuration parameters, retransmit probe packets that were not validly received at the receiving computing device. Accordingly, the sending computing device when updating the search variables may select one or more probe packets (provided the corresponding transmission of the probe packets has not reached the configured retry limit) that were not validly received in the current iteration for transmitting in the next iteration. With respect to the updates, the maximum packet size (search_max) may be smaller (e.g., by 1 byte) than the largest probe packet in the current iteration that was not validly received at the receiving computing device. The minimum packet size (search_min) may be larger than (e.g., by 1 byte) than the largest probe packet in current iteration that was validly received at the receiving computing device. The LastWorkingProbe may be the size of the largest probe packet that was validly received at the receiving computing device.

In a next step 716, the sending computing device may determine whether retry limits (e.g., retry_count<configured_retry_limit) have been reached for one or more probe packets that may have to be retransmitted. If the sending computing device determines that the retry limit has not been reached for at least one probe packet, the sending computing device may execute step 728 to generate a new probe set (e.g., for the next iteration). More particularly, the new probe set may include the updated seach_max, the updated search_min, and the probe packets that were not validly received in the current iteration (e.g., those probe packets within the range of the search_min and the search_max). Based on this new probe set, the sending computing device may execute step 724 to apply a backout time and execute step 704 to start the next iteration of sending a next burst of probe packets.

However, if the sending computing device determines that no retransmits are needed or that the configured retry limits have been reached, the sending computing device may execute step 718. In step 718, the sending computing device may determine whether the minimum probe packet size is larger than the maximum probe packet size in the updated search variables. If the sending computing device determines that the minimum packet probe packet size is not larger than the maximum probe packet size (search_min>search_max=false), the sending computing device may execute step 730 to generate a new probe set with a new search_max, which may be smaller than the largest probe packet that was not validly received and a new search_min, which may be larger than the largest probe packet that was validly received, and a trailer, which may generally be the largest probe packet that was validly received. A non-limiting example 1 below details multiple iterations of generating a new probe set until the condition of search_min>search_max=false remains satisfied. The sending computing device may then execute step 724 to apply a backout time, if set, and execute step 704 to start the next iteration.

However, if the sending computing device determines that minimum probe packet size is larger than the maximum packet size (search_min>search_max=true), the computer may execute step 720. In step 720, based on the condition that search_min>search_max=true, the sending computing device may determine that the PMTU may not be in the range of {pivot+1, search_max}. The sending computing device may check whether the minimum probe packet is larger than 1 byte added to the last working probe packet (search_min>LastWorkingProbe+1=true). If the sending computing device determines that this condition is true, the sending computing device may execute step 732 to generate a new probe set containing {pivot, LastWorkingProbe+1, trailer}. An example of this probe set is described in Example 2 below. The sending computing device may then execute step 724 to apply backout time, if any, and execute step 704 to start the next iteration.

However, if the sending computing device determines that the condition search_min>LastWorkingProbe+1=false, the sending computing device may execute step 722 to set the new PMTU to be the size of the last working probe packet. The PMTU discovery process may then end.

Example 1: PMTU discovery at first connect. This description is intended as a non-limiting example of PMTU discovery when a sending computing device connects to a receiving computing device. The initial configuration may be as follows: starting point (or the PMTU that may be guaranteed to work)=1024 bytes, maximum (e.g., a maximum possible packet size that may be supported by the path)=1500 bytes, and maximum window (e.g., maximum number of packets in one iteration)=7 packets. The pivot may therefore be 1024 bytes.

In a first iteration (Iter #1), the sending computing device may set the search variables in the probe set as follows: search_min=1025 bytes (pivot+1), search_max=1500 bytes (maximum possible packet size), and trailer=LastWorkingProbe=1024 bytes (pivot). The size of the probe packets (in bytes) in this iteration therefore may be {1500 (search_max), 1025 (search_min), 1024 (trailer)}.

The sending computing device may transmit a burst with the three probe packets and, based on the responses from the receiving computing device, generates a response matrix as follows: RE_1500=0 (probe packet lost), RE_1025=1 (probe packet validly received), and RE_1024=1 (probe packet validly received). If configured for retrying for the 1500 byte probe packet, the sending computing device may retransmit the 1500 byte probe packet to the receiving computing device. For the ease of explanation, it is assumed that either the 1500 byte probe packet was not retransmitted or the subsequently retransmitted 1500 byte probe packets were also lost. (The assumption is applied for the subsequent iterations as well.) In other words, the largest probe packet that was validly received at the receiving computing device in Iter #1 may be 1025.

In a second iteration (Iter #2), the sending computing device may set the search variables in the probe set based on the response matrix from Iter #1. The search_min may be larger than the size of the largest probe packet validly received in Iter #1 (e.g., 1 byte larger: 1026 bytes). The search_max may be smaller than the largest probe that was not validly received in Iter #1 (e.g., 1 byte smaller: 1499 bytes). The trailer may be the last working probe packet, which may be the largest probe packet that was validly received in Iter #1 (1025 bytes). As the maximum window=7 packets, the probe set may include four more elements between the 1499 (search_max) and 1026 (search_min) sized based on the difference between search_max and search_min. Here, the four elements may be staggered by approximately: (1499–1026)/5 bytes~95 bytes. Therefore, the size of the probe packets in this iteration may be {1499, 1404, 1309, 1214, 1119, 1026, 1025}. Prior to sending a burst of these packets, the sending computing device may check whether search_min>search_max=false (e.g., in step 718 above). The sending computing device may transmit the burst if this condition is satisfied (here, it is). This check may allow the sending computing device to determine whether the search window has converged. After the transmission, the sending computing device may generate a response matrix based on the responses received from the receiving computing device. As shown, the response matrix for Iter #2 may be {0, 0, 1, 1, 1, 1, 1}. If configured for retransmitting probe packets, the sending computing device may retransmit the 1499 and 1404 byte probe packets.

In the third iteration (Iter #3), the sending computing device may set the search variables in the probe set based on the response matrix from Iter #2. The search_min may be larger than the size of the largest probe packet that was validly received in Iter #2 (e.g., 1 byte larger than 1309 bytes). The search_max may be smaller than the largest probe packet that was not validly received in Iter #2 (e.g., 1 byte smaller than 1404 bytes). The trailer may be the last working probe packet, which may be the largest probe packet that was validly received in Iter #2 (1309 bytes). As the maximum window=7 packets, the probe set may include four more elements between 1403 (search_max) and 1310 (search_min) sized based on the difference between search_max and search_min. Here, the four elements can be staggered by approximately: (1403–1310)/5 bytes~19 bytes. Therefore, the size of the probe packets in Iter #3 may be {1403, 1384, 1365, 1346, 1327, 1310, 1309}. Prior to sending a burst of these probe packets, the sending computing device may check whether search_min>search_max=false. The sending computing device may transmit the burst if this condition is satisfied (here, it is). After the transmission, the sending computing device may generate a response matrix based on the responses received from the receiving computing device. As shown, the response matrix for Iter #3 may be {0, 1, 1, 1, 1, 1, 1}. If configured for retransmitting lost probe packets, the sending computing device may retransmit the 1403 byte probe packet.

In the fourth iteration (Iter #4), the sending computing device may set the search variables in the probe set based on the response matrix from Iter #3. The search_min may be larger than the size of the largest probe packet that was validly received in Iter #3 (e.g., 1 byte larger than 1384 bytes). The search_max may be smaller than the largest probe packet that was not validly received in Iter #3 (e.g., 1 byte smaller than 1403 bytes). The trailer may be the last working probe packet, which may be the largest probe packet that was validly received in Iter #3 (1384 bytes). As the maximum window=7, the probe set may include four more elements between 1402 (search_max) and 1385 (search_min) sized based on the difference between search_max and search_min. Here, the four elements may be staggered by approximately: (1402−1385)/5~4 bytes. Therefore, the size of the probe packets in Iter #4 may be {1402, 1398, 1394, 1390, 1386, 1385, 1384}. Prior to sending a burst of these probe packets, the sending computing device may check whether search_min>search_max=false. The sending computing device may transmit the burst if this condition is satisfied (here, it is). After the transmission, the sending computing device may generate a response matrix based on the responses received from the receiving computing device. As shown, the response matrix for Iter #4 may be {0, 1, 1, 1, 1, 1, 1}. If configured for retransmitting lost probe packets, the sending computing device may retransmit the 1402 byte probe packet.

In the fifth iteration (Iter #5), the sending computing device may set the search variables in the probe set based on the response matrix from Iter #4. The search_min may be larger than the size of the largest probe packet that was validly received in Iter #4 (e.g., 1 byte larger than 1398). The search_max may be smaller than the largest probe packet that was not validly received in Iter #4 (e.g., 1 byte smaller than 1402 bytes). The trailer may be the largest working probe packet, which may the largest probe packet that was validly received in Iter #4 (1398 bytes). Although the maximum window=7, the difference between the search_max and search_min is 1401-1399 bytes=2 bytes and only 1 probe packet may be accommodated between 1401 and 1399. Therefore, the size of the probe packets in Iter #5 may be {1401, 1400, 1399, 1398}. Prior to sending a burst of these probe packets, the sending computing device may check whether search_min>search_max=false. The sending computing device may transmit the burst if this condition is satisfied (here, it is). After the transmission, the sending computing device may generate a response matrix based on the responses received from the receiving computing device. As shown, the response matrix for Iter #5 may be {0, 1, 1, 1}. If configured for retransmitting lost probe packets, the sending computing device may retransmit the 1401 byte probe packet.

For the sixth iteration (Iter #6), the sending computing may set the search variables in the probe set based on the response matrix from Iter #5. The search_min may be larger than the largest probe packet that was validly received in Iter #5 (e.g., 1 byte larger than 1400 bytes). The search_max may be smaller than the largest probe packet that was not validly received in Iter #5 (e.g., 1 byte smaller than 1401). The trailer may be the largest working probe packet, which may be the largest probe packet that was validly received in Iter #5 (1400 bytes). Prior to sending a burst of probe packets for this iteration, the sending computing device may check whether search_min>search_max=false. The sending computing device may transmit the burst if this condition is satisfied. Here, the first condition of search_min>search_max=false is not satisfied (search_min=1401, search_max=1400, and therefore search_min>search_max=true). The sending computing device may then check whether the second condition of search_min>LastWorkingProbe+1=true is satisfied. Here the second condition is not satisfied (search_min (1401)=LastWorkingProbe (1400)+1)) (as in step 720 above). Based on the second condition not being satisfied, the sending computing device may determine that the search has converged and no further refinement of the search range is possible. The sending computing device may then select the last working probe size (here, 1400 bytes) as the PMTU of the path.

Example #2: PMTU discovery using previously found PMTU as a pivot. The initial configuration may be as follows: starting point (or the PMTU that may be guaranteed to work)=1024 bytes, maximum (e.g., maximum possible packet size supported by the path)=1500 bytes, maximum window (e.g., number of packets in one iteration)=7 packets, and pivot=previously found MTU=1400 bytes.

In a first iteration (Iter #1), the sending computing device may set the search variables in the probe set as follows: search_min=1401 bytes (pivot+1), search_max=1500 bytes (maximum possible packet size), and trailer=LastWorkingProbe=1024 bytes (PMTU that may be guaranteed to work). Therefore, the size of the probe packets (in bytes) in this iteration may be {1500 (search_max), 1401 (search_min), 1024 (trailer)}. The sending computing device may transmit a burst with these three probe packets, and based on the responses from the receiving computing device, generates a response matrix as follows: RE_1500=0 (probe packet lost), RE_1401=0 (probe packet lost), and RE_1024=1 (probe packet validly received). Therefore, the largest probe packet that was validly received at the receiving computing device in Iter #1 may be 1024. The response matrix may therefore indicate that the PMTU is not in the range of {pivot+1, search_max} (as in step 720 above and the description of the second iteration below).

The search_min for the second iteration (Iter #2) based on this response matrix is 1401 bytes, 1 byte larger than the largest packet that has been validly received at the receiving computing device (i.e., the pivot). The search_max for the Iter #2 is 1400 bytes, 1 byte smaller than the largest packet that was not validly received at the receiving computing device. The sending computing device may check whether the condition search_min>search_max=false (as in step 718 above) is satisfied. As this condition is not satisfied, the sending computing device may determine that the PMTU is not in the range of {pivot+1, search_max} and that this probe set may have to be revised. Prior to revising the probe set, the sending computing device may check for the condition whether search_min>LastWorkingProbe+1=true (here, it is because 1401>(1024+1)). For the revised probe set, the revised search_max may be the pivot itself, as described above. The revised search_min may be larger than (e.g., 1 byte larger) than the largest packet that was validly received by the receiving computing device in Iter #1 (e.g., 1024+1=1025 bytes). The trailer may be the last working probe packet, which may the largest probe packet that was validly received in Iter #1 (1024 bytes). Therefore, the size of the probe packets in this iteration may be {1400, 1025, 1024} (as in step 732 above). After the transmission, the sending computing device may generate a response matrix based on the responses received from the receiving computing device. As shown, the response matrix for Iter #2 may be {1, 1, 1}.

For a third iteration (Iter #3), the sending computing device may update the search variables in the probe set based on the response matrix from Iter #2. The search_min may be larger than the largest probe packet that was validly received in Iter #2 (e.g., 1 byte larger than 1400 bytes). The search_max may be 1 byte smaller than the largest probe packet that was not validly received in the previous iteration (Iter #2). However, all probe packets in the previous iteration (Iter #2) were received). Therefore, search_max may remain the same as in Iter #2 (e.g., 1400 bytes). The trailer may be the largest working probe packet, which may be the largest probe packet that was validly received in Iter #2 (1400 bytes). The probe set indicating the size of the probe packets to be sent in Iter #3 therefore may be {1400, 1401, 1400}. However, prior to sending a burst of probe packets for this iteration, the sending computing device may check whether search_min>search_max=false (here, it is not because search_min (1401)>search_max (1400)). The sending computing device may then check for the second condition of whether search_min>LastWorkingProbe+1=true (here it is not because search_min (1401)=LastWorkingProbe (1400)+1)). As the second condition is not satisfied, the sending computing device may determine that the search has converged (e.g., no more adjustment of the search range is possible) and set the PMTU as the last working probe size (here 1400 bytes).

When sending the probe packets, the sending computing device may set a "do not fragment" flag in the probe packet, e.g., set DF bit to 1 in the IP header. When sending the probe response packets, the receiving computing device may also set the "do not fragment" flag in the probe response packet. This may instruct any intermediaries, e.g. gateways or other appliances in between, to not fragment the packets. Because fragmentation may not be permitted, some large probe packets or the responses to some large probe packets may be dropped by intermediaries but this may be a desired outcome. Otherwise, it may be possible that an intermediary appliance or a set of intermediaries may have the ability to fragment large packets and then reassemble them. In this case, the sending computing device-receiving computing device transport connection may continue to work, e.g., there may be no dropped connections (no "black holes"), which may be an improvement, but the discovered PMTU and overall performance may not be optimal due to the potential fragmentation of large packets.

Optimization Examples. The computing devices may check for defaults prior to sending the bursts. For example, a sending computing device may set a default search range of {1500, 1025}, where 1500 bytes is the maximum possible packet size and 1025 is 1 byte added to the minimum packet size that may be guaranteed to work. The sending computing device may transmit probe packets for these default values prior to sending the bursts. If the response matrix for these packets indicate RE_1500=RE_1025=1, the sending computing device may set the PMTU to be 1500 bytes (the default maximum). Alternatively, if the response matrix indicates RE_1500=RE_1025=0, the sending computing device may set the PMTU to be 1024 bytes (the default minimum) Alternatively, if the response matrix indicates RE_1500=0 and RE_1025=1, the sending computing device may determine that the PMTU may not be a default value and start the transmission of the bursts to determine the PMTU, which may be between 1499 and 1025 bytes.

As another example optimization, the computing devices may use a pivot to define a starting search range, as described in Example #2. For example, if the pivot is 1400 bytes, the sending computing device may generate as a starting search range, two disjoint sets: {1500, 1401} and {1400, 1025}. As further described in Example #2, the sending computing device may evaluate the first disjoint set, if no PMTU is found in the range, evaluate for the second disjoint set.

As yet another example optimization, the computing devices may, during the initial protocol, determine the maximum supported MTUs of all the network devices. The sending computing device may use the minimum of the maximum supported MTU as a search_max as a default maximum. Steps 1112-1128 of method 1100 shown in FIG. 11 describe this example optimization in detail.

Figure 8:
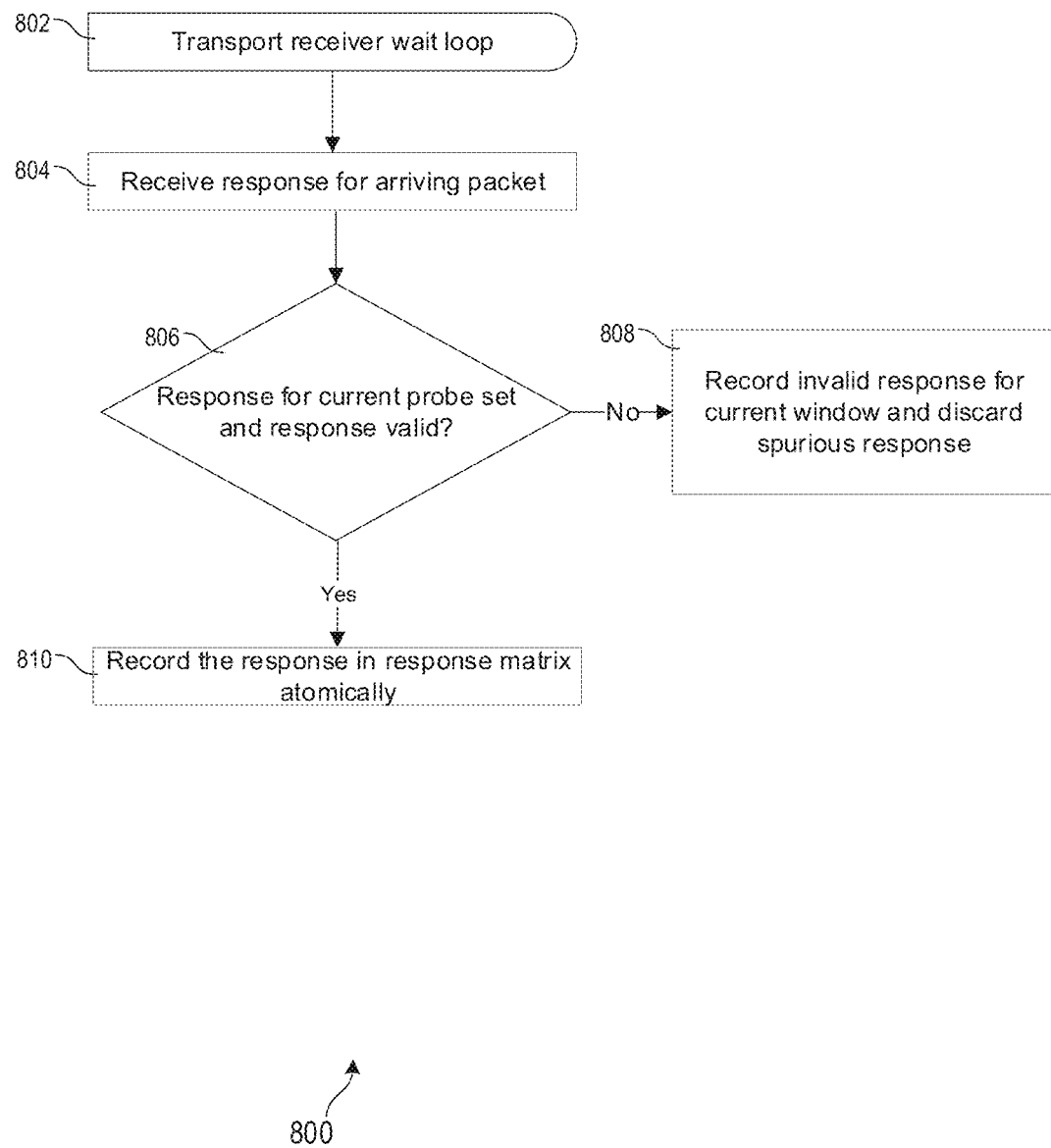
FIG. 8 depicts an illustrative method executed by a received thread during a PMTU discovery.

FIG. 8 shows a flowchart of an example method 800 for PMTU discovery. In particular, a sending computing device (e.g., a client 240, client computers 411-414, client 540, mobile device 602, and/or mobile device 6020) may perform the steps of the method 800 as a receiver thread for receiving messages from a receiving computing device (e.g., computing device 201, virtualization server 301, management server 401, one or more servers in the cloud computing environment 512, and/or enterprise resources 604). during the PMTU discovery process. The receiver thread may listen for and process incoming communications at the sending computing device in parallel with the sender thread described above. It should be understood that that the steps of the method are merely exemplary and methods with additional, alternative, or fewer number of steps should also be considered within the scope of this disclosure. It should also be understood that the sending computing device being on the client side and the receiving computing device being on the server is merely an example and should not be considered limiting. The sending computing device may be on the server side ((e.g., computing device 201, virtualization server 301, management server 401, one or more servers in the cloud computing environment 512, and/or enterprise resources 604) and the receiving computing device may be on the client side (e.g., a client 240, client computers 411-414, client 540, mobile device 602, and/or mobile device 6020).

In step 802, the sending computing device may execute a wait loop to wait for messages from the receiving computing device. The wait loop may repeatedly check whether a message is received from the receiving computing device. The interval between the repeated checks may be of any amount of time. Examples of messages checked for by the wait loop may include acknowledgements and/or any other kind of responses of receipts of corresponding probe packets.

In step 804, the sending computing device may receive a response to a probe packet arriving at the receiving computing device. The response may be, as described above, an acknowledgement and/or any other kind of response indicating that the probe packet was received at the receiving computing device.

In step 806, the sending computing device may check whether the response is for the current burst (or current iteration of probe packets) and whether the response is valid. The sending computing device may check whether the response is for the current burst based on the sequence number and/or size of the packet of which the receipt has been acknowledged by the receiving computing device. If either or both of these conditions are not satisfied (e.g., the response is for a probe packet of a previous burst and/or the response is not valid), the sending computing device may execute step 808. In step 808, the sending computing device may record the response as being invalid for the current window (or iteration) and discard the response.

However, if the sending computing device determines that both of these conditions are satisfied, the sending computing device may execute step 810 to record the response in the response matrix for the current window. The sending computing device may process this response matrix to determine the probe set for the next window.

Figure 11:
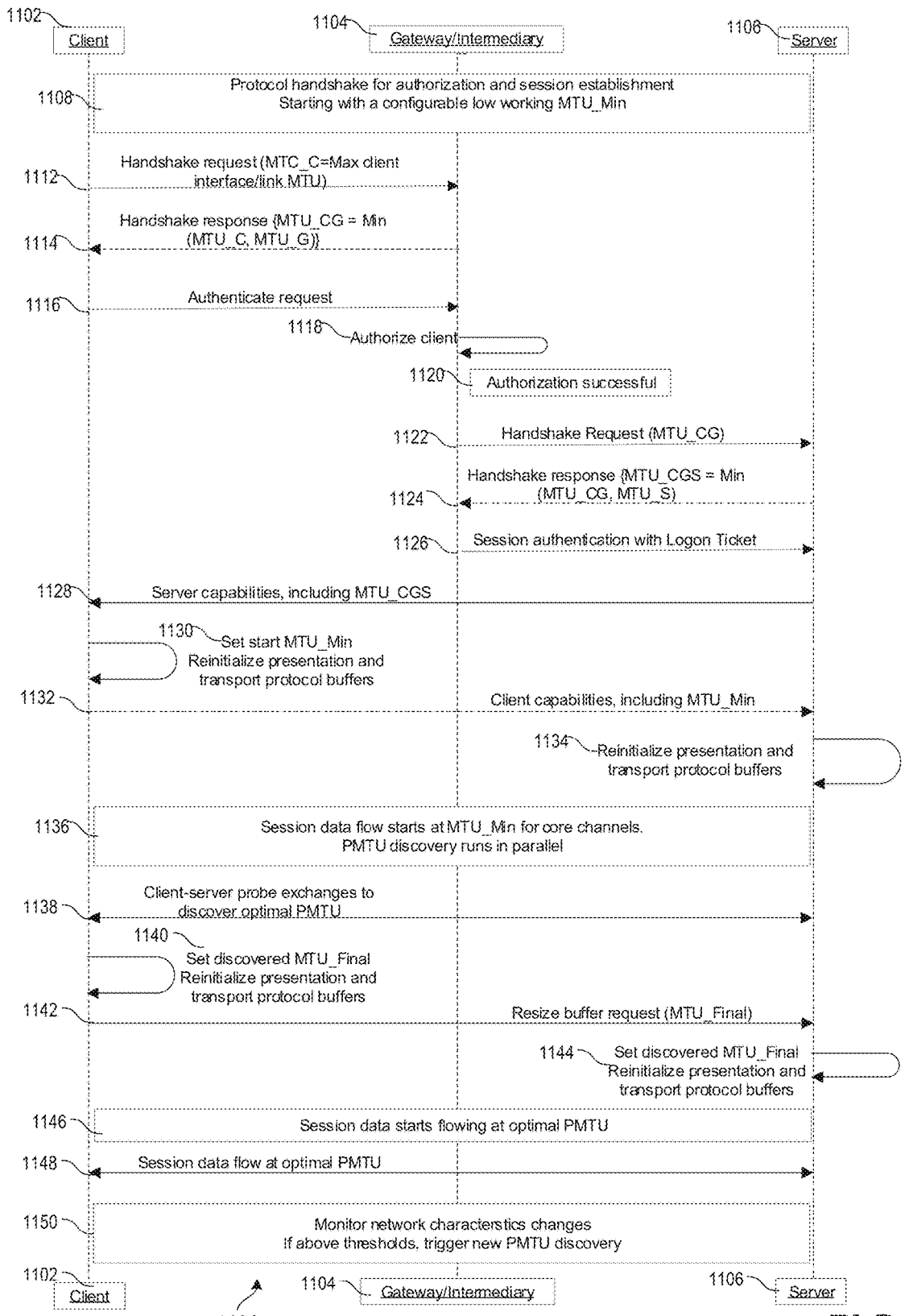
FIG. 11 depicts an illustrative process flow for PMTU discovery.

FIG. 11 shows an example process flow 1100 of PMTU discovery. Although multiple computing devices may perform one or more steps of the process flow 1100, this description details, for ease of explanation, a client 1102 (an example of a sending computing device), a gateway/intermediary computing device ("gateway") 1104, and a server 1106 (an example of a host or a receiving computing device) performing the steps of the process flow 1100. It should further be understood that the following steps of the process flow 1100 are merely intended as examples and other process flows with additional, alternative, and fewer number of steps should be considered within the scope of this disclosure.

In step 1108, the client 1102, the gateway 1104, and the server 1106 may perform an initial protocol handshake for authorization and session establishment. Non-limiting examples of the protocol may include Transport Layer Security (TLS), Transmission Control Protocol (TCP), Datagram Transport Layer Security (DTLS), User Datagram Protocol (UDP), Enlightened Data Transport (EDT) protocol developed by Citrix Systems, Common Gateway Protocol (CGP) protocol developed by Citrix Systems, and Independent Computing Architecture (ICA) protocol developed by Citrix Systems. During this protocol handshake, these computing devices (one or more of the client 1102, the gateway 1104, and the server 1106) may start packet exchanges using a low configurable MTU (MTU_Min), which may be 1024 bytes (e.g., the minimum packet size supported by Ethernet).

The following steps 1112-1128 of the computing devices negotiating the minimum of the maximum MTU supported by all the computing devices (e.g., the client 1102, the gateway 1104, the server 1106, and other computing devices in the path between the client 1102 and the server 1106) may be optional. In step 1112, the client 1102 may transmit a handshake request to the gateway 1104. The handshake request may include a maximum of the client interference MTU (MTU_C). In step 1114, the gateway 1104 may transmit a handshake response, which may include the minimum of the MTUs (MTU_CG) supported by the client 1102 interface and the gateway 1104 interface (or, MTU_CG=Min (MTU_C, MTU_G)). In step 1116, the client device 1102 may transmit an authentication request to the gateway 1104. The authentication request may include an authorization ticket and/or a logon ticket containing the authentication credentials of a user associated with the client 1102. The gateway 1104 may use the authorization ticket and/or the logon ticket in step 1118 to authorize the client 1102, and may determine in step 1120 that the authorization is successful. In step 1122, the gateway 1104 may transmit a handshake request to the sever 1106. The handshake request may include the minimum of the MTU's supported by the client 1102 and the gateway 1104 (MTU_CG). In step 1124, the server 1106 may transmit back a handshake response with the minimum of the MTUs (MTU_CGS) supported by the client 1102 interface, the gateway 1104 interface, and the server 1106 interface (or MTU_CGS=Min (MTU_CG, MTU_S)). In step 1126, the gateway 1104 may perform a session authentication with the server 1106 using the login ticket received from the client 1102 in step 1116. In step 1128, the server 1106 may transmit the capabilities of the server 1106 including MTU_CGS back to the client 1102 through the gateway 1104.

In step 1130, the client 1102 may set as a starting point, a guaranteed MTU_Min, which may be 1024 bytes. The client device 1102 may further re-initialize the presentation and/or transport layer protocol buffers. For example, the client 1102 may initialize a receive buffer (for presentation and/or buffer layers) that may be based on MTU_CGS. In particular, the receive buffer may be sized to include MTU_CGS bytes minus protocol overhead bytes for one or more protocols (e.g., protocols identified above). Alternatively, if the aforementioned negotiation to determine MTU_CGS was not performed, the client computing device may set the size of the receive buffer to a predetermined size (e.g., the maximum possible size of 1500 bytes). In addition to the receive buffer, the client device 1102 may also reinitialize the send buffer. The send buffer may be based on the starting MTU (MTU_Min), such as 1024 bytes. More particularly, the size of the send buffer may be MTU_Min bytes minus bytes for the protocol overheads.

In step 1132, the client 1102 may transmit the client capabilities including the MTU_Min to the server 1106. In response, the server 1106 in step 1134 may reinitialize its presentation and/or transport layer protocol buffers. For example, the server 1106 may initialize its receive buffer based on MTU_CGS (if the optional determination was made, as above) or the theoretical maximum of 1500 bytes, minus bytes to accommodate protocol overheads. The sever 1106 may also initialize the send buffers based on MTU_Min, minus bytes to accommodate protocol overheads.

In step 1136, the client 1102, the gateway 1104, and server 1106 may start the session data flow using MTU_Min for the core ICA protocol and virtual channels protocols. The PMTU discovery may run in parallel (e.g., based on the methods 700 and 800). For example, in step 1138, the client 1102, the gateway 1104, and the server 1106 may exchanges probe packets to determine the optimal PMTU between the client 1102 and the server 1106.

In step 1140, the client device 1102 may reinitialize (or adjust) presentation and/or transport layer protocol buffers based on the discovered PMTU (MTU_Final). More particularly, the client device 1102 may update the size of the buffers to have MTU_Final bytes minus bytes to accommodate protocol overheads. In step 1142, the client 1102 may transmit the a resize buffer request including an indication of MTU_Final. In step 1144, the server 1106 may accordingly update the size of its presentation and/or transport layer buffers based on the MTU_Final, minus bytes for protocol overheads. In step 1146, the session data between the client 1102 and the server 1106 may start flowing with the discovered optimal PMTU (MTU_Final). In step 1148, the session data may continue flowing with MTU_Final.

In step 1150, at least one of the client 1102, the gateway 1104, and the server 1106 (or any other computing device) may monitor the changes in the network characteristics. The network characteristics may be, for example, loss, latency, and bandwidth. If one of these characteristics is determined to be above a threshold, the PMTU discovery process may be triggered again.

Figure 12:
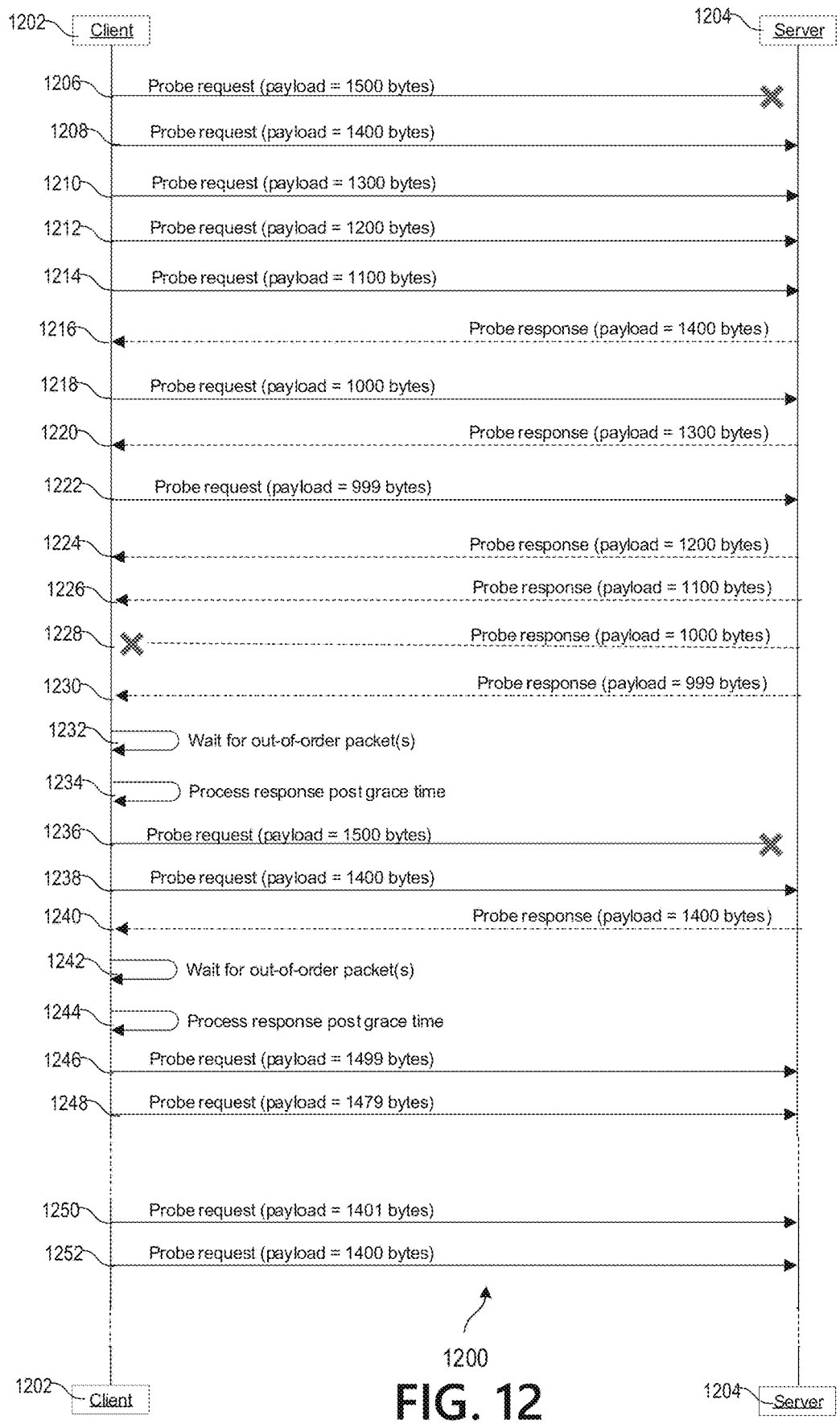
FIG. 12 depicts an illustrative process flow for PMTU discovery.

FIG. 12 shows a process diagram 1200 of a segment of a PMTU discovery process. Although the steps of the process 1200 may be performed by multiple computing devices, the following description details, for the ease of explanation, the various steps being performed by a client 1202 (an example of a sending computing device) and a server 1204 (an example of a receiving computing device). It should be also understood that the client 1202 triggering the PMTU discovery as described in the steps below is merely an example, the PMTU discovery process may be triggered on the server 1204 as well. Furthermore, the steps described herein are merely exemplary and processes with additional, alternative, and fewer number of steps should also be considered within the scope of this disclosure.

Steps 1206-1232 may correspond to a single burst of probe packets transmitted from the client 1202 to the server 1204 and one or more responses thereto from the server 1204 to the client 1202. In step 1206, the client 1202 may transmit a probe packet with a payload of 1500 bytes to the server. As shown, this probe packet may not validly reach the sever 1204. In step 1208, the client 1202 may transmit a probe packet with a payload of 1400 bytes to the server 1204. In step 1210, the client 1202 may transmit a probe packet with a payload of 1300 bytes to the server 1204. In step 1212, the client 1202 may transmit a probe packet with a payload of 1200 bytes to the server 1204. In step 1214, the client 1202 may transmit a probe packet with a payload of 1100 bytes to the server 1204. In step 1216, the client 1202 may receive a response for the probe packet with the payload of 1400 bytes from the server 1204, wherein the response may indicate that the probe packet with successfully received at the server 1204. In step 1218, the client 1202 may transmit a probe packet with a payload of 1000 bytes to the server 1204. In step 1220, the client 1202 may receive a response to the probe packet with the payload of 1300 bytes from the server 1204, wherein the probe response may indicate that the probe packet was validly received at the server 1204. In step 1222, the client 1202 may transmit a trailer packet with a payload of 999 bytes to the server 1204. In step 1224, the client device 1202 may receive a response to the probe packet with the payload of 1200 bytes from the server, the response indicating the that the probe packet was validly received at the server 1204. In 1226, the client device 1202 may receive a response to the probe packet with the payload of 1100 bytes from the server 1204, the response indicating that the probe packet was validly received at the server. At step 1228, the server 1204 may transmit a response indicating a valid receipt of the probe packet with the payload of 1000 bytes but the response may be lost in the path before reaching the client 1202. In step 1230, the client 1202 may receive a response to the trailer packet with the payload of 999 bytes from the server 1204, the response indicating that the trailer packet was validly received at the server. At step 1232, the client 1202 may wait for a grace time for responses from the server 1204 corresponding to one or more out of order packets (as in step 712 in method 700).

After the grace time is over, the client 1202 in step 1234 may process the response matrix for the aforementioned probe packets. The response matrix may indicate that the last working probe packet may be a 1400 byte probe packet (i.e., a probe packet with 1400 byte payload). The minimum probe packet size for the next iteration (search_min) for the next iteration may therefore be larger than the 1400 bytes, for example, 1401 bytes. The configuration for the process 1200 may indicate that that the probe packet with the payload of 1500 bytes may have to be retransmitted, and therefore the maximum probe size (search_max) for the next iteration may be 1500 bytes. In step 1236, the client 1202 may transmit the search_max (or retransmit the probe packet with the payload of 1500 bytes) to the server 1204. However, as shown, the server 1204 may not receive the 1500 byte probe packet. In step 1238, the client device 1202 may transmit the trailer probe (i.e., probe packet with the payload of 140 bytes). In step 1240, the client 1202 may receive a response corresponding to the trailer probe packet with a payload of 1400 bytes from the server, the response indicating that the trailer probe packet was validly received at the server 1204. In step 1242, the client device may wait for a grace time for out of order packets.

After the grace time is over, the client device 1202 may process the response matrix in step 1244. The response matrix may indicate that the 1400 byte trailer packet was validly received at the server 1204 but the retransmitted 1500 byte probe packet was still not received by the server 1204. Therefore, based on this response matrix, the client device 1202 may set search_max for the next iteration (or burst) to be 1499 bytes (only the search_max is shown in the process 1200 for the ease of explanation). Steps 1246-1252 show the various probe packets transmitted by the client 1202 to the server 1204 for the next iteration. In step 1246, the client 1202 may transmit a probe packet with a payload of 1499 bytes (search_max) to the server 1204. In step 1248, the client 1202 may transmit a probe packet with a payload of 1479 bytes to the server 1204. In step 1250 the client 1202 may transmit a probe packet with a payload of 1401 bytes (search_min) to the server 1204. In step 1252, the client may transmit a trailer packet with a payload of 1400 bytes to the server 1204. The client 1202 and the server 1204 may perform similar steps until the PMTU is discovered.

Figure 13:
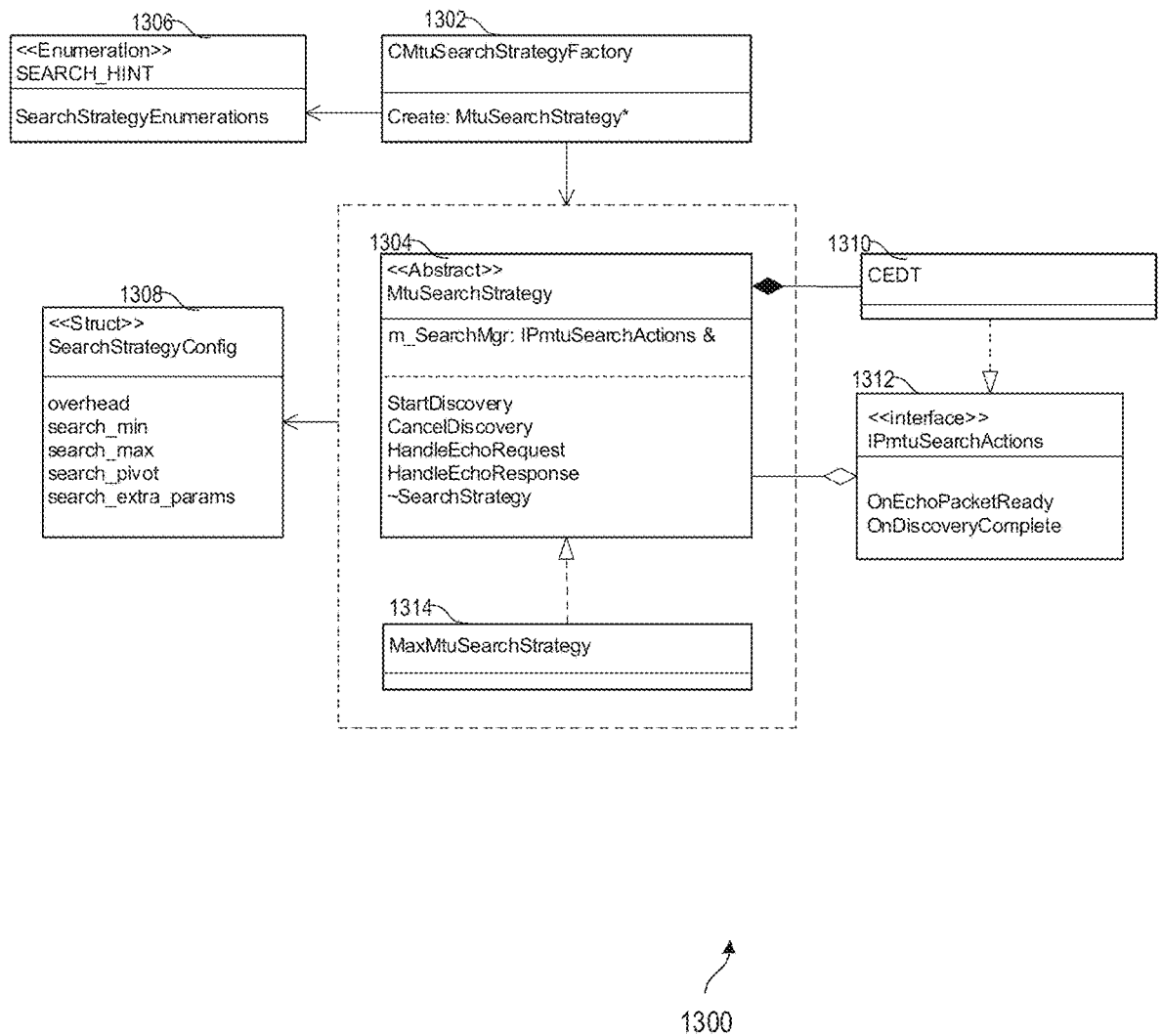
FIG. 13 depicts an illustrative implementation of the algorithm for PMTU discovery.

FIG. 13 shows an example implementation 1300 of a search strategy architecture for the PMTU discovery process. As shown, the example implementation 1300 may use a factory, implemented as a class CMtuSearchStrategyFactory 1302, to allow for different strategy targeting for different types of networks, network paths, channels, and/or any other types of constraints and conditions between two connected computing devices (e.g., a client and a server). The function of the class CMtuSearchStrategyFactory 1302 may be to create multiple MTU search strategy classes, an example which is shown as an abstract class MTUSearchStrategy 1304, based on various search strategies, stored as SearchStrategyEnumerations stored in an enumeration class 1306.

The MTUSearchStrategy class 1304 may define the attributes and functions for searching an optimal MTU between two connected computing devices. The attributes may include search actions that may have to be executed. The functions may include starting the optimal MTU discovery process based a configuration defined by a structure class SearchStrategyConfig 1308. The functions may further include a cancel discovery function, a function for handling an echo request (i.e., transmitted probe packets), a function for handling an echo response (i.e., received responses for corresponding probe packets), and search strategy function implementing a selected search strategy (e.g., updating a search probe). A class CMaxMtuSearchStrategy 1314 may implement the MTUSearchStrategy class 1304 to determine a PMTU between the two connected computing devices.

The structure class SearchStrategyConfig 1308 may define the configuration parameters for the MTUSearchStrategy class 1304. The configuration parameters may be defined by the attributes of the SearchStrategyConfig class 1308. The attributes may include overhead (e.g., protocol overhead), the size of the minimum probe packet (search_min), the size of the maximum probe packet (search_max), the size of a pivot packet (search_pivot), and any other parameters (search_extra_params).

An interface class IPmtuSearchActions 1312 may define the interface functions for the implementation 1300 with other programs and/or protocols, such as the IP protocol being used to transmit the probe packets between the connected computing devices. The interface function may include OnEchoPacketReady, which may define an IP operation (e.g., transmitting a probe packet when the probe packet is ready), and OnDiscoveryComplete, which may define an operation of transmitting PMTU or an error code when the PMTU discovery process is completed. The IPmtuSearchActions class 1312 may be an aggregate of the of the MtuSearchStrategy class.

A CEDT class 1310 may define the attributes and functions of the UDT protocol that may be used to transmit the probe packets between the two computing devices. The CEDT class 1310 may be contained by the MtuSearchStrategy class 1304.

It should therefore be understood that the example implementation 1300 may structurally allow for a separate evaluating interface and strategy. For example, using the example implementation 1300, search strategy and the transport (e.g., EDT) are decoupled and interact through interface and therefore dependencies may be easily mocked.

Figure 14:
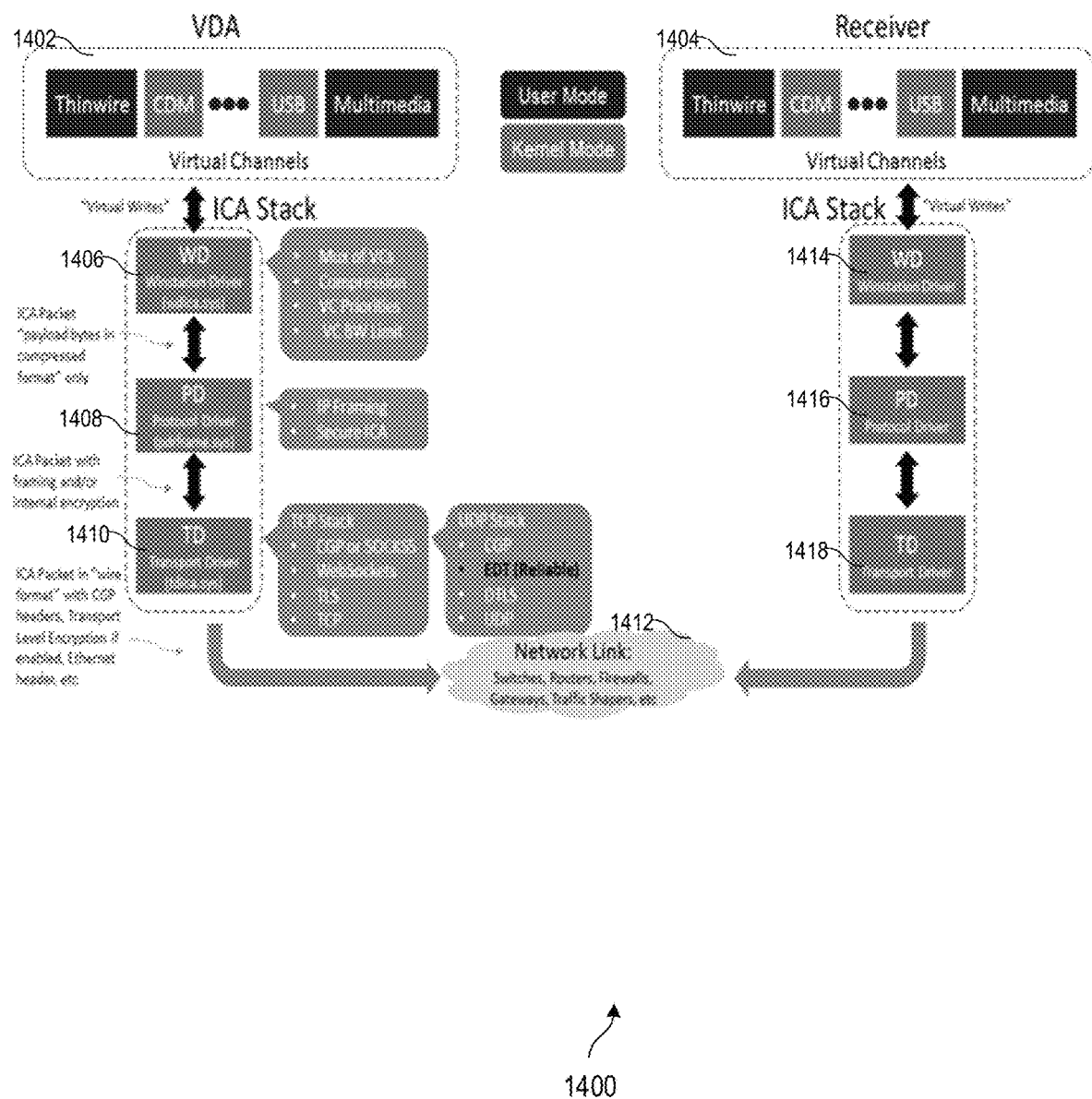
FIG. 14 depicts an illustrative network architecture using a PMTU discovery.

FIG. 14 shows an example architecture 1400 for implementing the PMTU discovery processes described throughout this disclosure. It should however be understood that the shown components of the architecture 1400 are merely exemplary and architectures with additional, alternative, and fewer number of the components should also be considered within the scope of this disclosure.

As shown, the architecture 1400 may comprise a host 1402 (also referred to as a virtual delivery agent, VDA) and a client 1404 (also referred to as a receiver). The host 1402 and the client 1404 may support a plurality of virtual channels for user mode and/or kernel mode operations. The user mode operations may include, for example, rendering remote display (e.g., Citrix Thinwire graphics remoting protocol) and multimedia operations. The kernel mode operations may include, for example, client drive mapping (CDM) operations and operations associated with one or more universal serial buses (USBs). In other words, the host 1402 and the client 1404 may allocate a channel for one or more of the aforementioned categories of operations. The ICA datastream generated by each of the host 1402 and the client 1404 may therefore include multiple virtual channels.

The host 1402 and the client 1404 may use protocols such as ICA to communicate with each other. To that end, each of the host 1402 and the client 1404 may execute a corresponding ICA stack. The ICA stack executed by the host 1402 may include a winstation driver 1406, a protocol driver 1408, and a transport driver 1410. Similarly, the ICA stack executed by the client 1404 may include a winstation driver 1414, a protocol driver 1416, and a transport driver 1418; the functionality of these drivers being similar to the corresponding drivers executed by the host 1402.

The winstation driver 1406 may multiplex the data in various virtual channels from the host 1402, determine the priorities for the various virtual channels, and set bandwidth limit for the virtual channels. The winstation driver may further compress the data stream to hand over ICA packets with payload bytes in compressed format to the protocol driver 1408. It should be understood that the winstation driver 1406 may perform these operations for data stream from the host 1402 to the client 1404 and that the winstation driver 1406 may perform reverse operations for data stream from the client 1404 to the host 1402.

The protocol driver 1408 may perform framing (e.g., add additional headers with packet size and priority information). The protocol driver 1408 may also perform an encryption operation to encrypt the payload of the ICA packet. The protocol driver 1408 may then provide the framed and encrypted ICA packet to the transport driver 1410.

The transport driver 1410 may be based on a transport protocol stack, such as a TCP stack or an UDP stack. Non-limiting examples of the TCP stack may include CGP or SOCKS5, Websockets, TLS, and TCP. Non-limiting examples of the UDP stack may include CGP, EDT, DTLS, and UDP. EDT may be considered a reliable transport protocol. Using one or more of the aforementioned protocols, the transport driver 1410 may provide the ICA data packets to a network link 1412. The ICA packets provided by the transport driver 1410 may therefore have transport level headers (e.g., CGP headers, TCP or EDT headers, etc.) and transport level encryption. The transport driver 1410 may also add IP headers and generate IP packets.

The network link 1412 may form a physical layer for transportation of ICA packets between the host 1402 and the client 1404. To that end, the network link 1412 may comprise switches, routers, firewalls, gateways, traffic shapers, and/or any other type of network computing devices.

As with the winstation driver 1406, the operations of the protocol driver 1408 and the transport driver 1410 have been described in terms of ICA packets from the host 1402 to the client 1404. It should be understood that the protocol driver 1408 and the transport driver 1410 may perform reverse operation while processing an ICA packet from the client 1404 through the network link 1412. For example, the transport driver 1410 may remove IP headers, the transport level headers, and the transport level encryption of an ICA packet received from the client 1404 before providing the packet to the protocol driver. It should further be understood that, on the client 1404 side, the winstation driver 1414, the protocol driver 1416, and the transport driver 1418 may perform similar operations as their counterparts at the host 1402 side.

In addition to discovering the PMTU for a network path between two computing devices, examples disclosed herein may also discover a performance optimal MTU. Especially for multiple paths from between two computing devices, a performance optimal MTU may not necessarily be a path with the highest PMTU. For example, the path with the highest PMTU may have other adverse network characteristics such as a lower throughput, a higher latency, and a higher loss percentage. A path with the performance optimal MTU may therefore be based upon throughput, latency, and loss percentage in addition to the PMTU.

Figure 15:
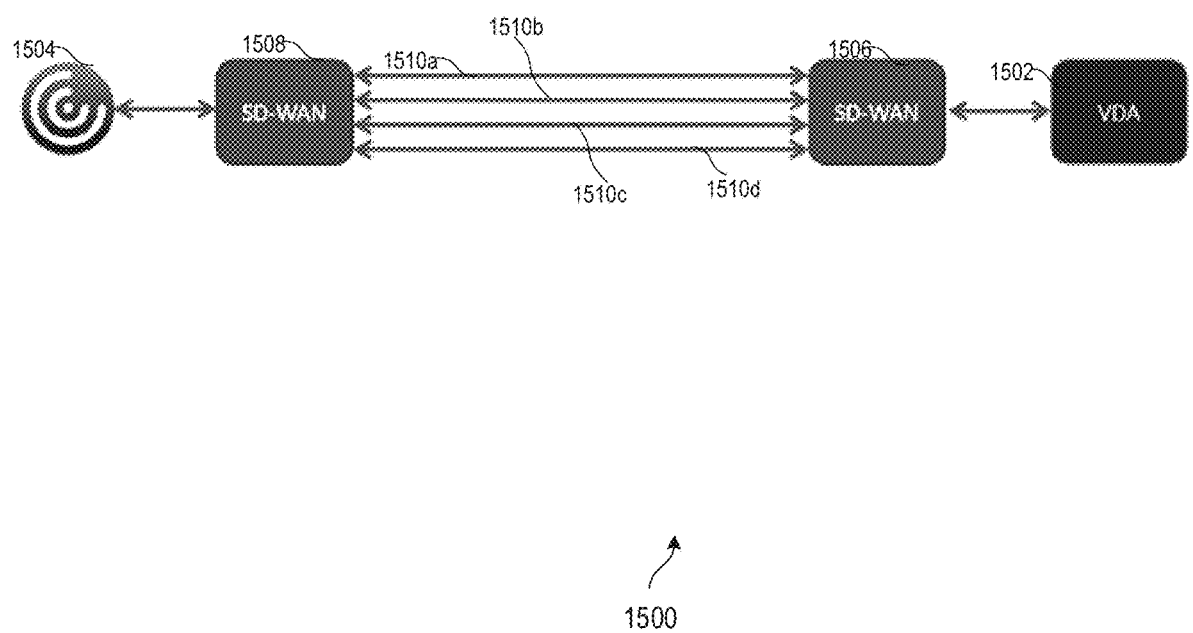
FIG. 15 depicts an illustrative network environment with multiple paths, with PMTU discovery being executed for each of the multiple paths.

FIG. 15 shows an example network environment 1500 with a multi-path scenario. As shown, the network environment 1500 may comprise a host 1502 and a client 1504 connected through gateways 1506 and 1508 of a software defined network. In some embodiments, the gateways 1506 and 1508 may be software defined wide area network (SD-WAN) appliances or cloud services. As illustrated in FIG. 15, within the software defined network and in between the gateways 1506 and 1508, there may be four paths 1510*a*, 1510*b*, 1510*c*, and 1510*d* (collectively or commonly referred to as 1510). However, it should be understood that in other embodiments there could be any number of paths between the gateways 1506 and 1508. A computing device (e.g., the client 1504) may determine PMTU and other network characteristics such as throughput, latency, and loss percentage for the paths 1510.

In some embodiments, a computing device (e.g., the client 1504 or the host 1502) may not necessarily be aware of the existence of the different paths 1510 in between gateways 1506 and 1508. The client 1504 and the host 1502 may therefore maintain a single logical stream. For example, the client 1504 and the host 1502 may maintain a single ICA presentation-level protocol stream. However, gateways 1506 and 1508 may route the same single logical stream over multiple simultaneous transport paths 1510, thus advantageously aggregating bandwidth or reducing latency, unbeknownst to the client 1504 or the host 1502. For example, a packet sent by the client 1504 may be routed by the gateway 1508 (the first gateway in the path towards the host 1502) over one of the many possible paths 1510. The gateway 1508 may also simultaneously send multiple instances of the same packet over two or more of the paths 1510. The gateway 1506 (the second gateway in the path towards the host 1502) may receive the packet over any of the paths 1510 and proceed to order the received packet within the single logical stream, e.g., based on packet sequence numbers, before forwarding the packet to the host 1502. The gateway 1506 may discard duplicate instances of the packets, e.g., based on the same sequence number. Thus, the first instance of a packet of a given sequence number to be received by gateway 1506 may be forwarded to the host 1502. The same method may apply for packets sent from the host 1502. In other words, the gateway 1506 (the first gateway in the path towards the client 1504) may send packets over one or more of the paths 1510, while gateway 1508 may order and deduplicate packets, then forward them to the client 1504 as a single logical stream.

To determine the PMTU of the paths 1510 without explicitly being aware of their existence, number, and/or network characteristics, etc., the client 1504 (just an example, the host 1502 may also perform these operations as well) may implement multiple bursts of probe packets as described in the plurality of examples described throughout the disclosure. However, after a burst, in addition to determining size of the last working probe packet, the new search_min, and the new search_max, the client 1504 may measure other network characteristics of the paths 1510 without explicitly knowing about their existence. For example, temporarily assuming the size of the last working probe packet to the PMTU, the client 1504 may transmit multiple packets of the same size to determine throughput, latency, and loss percentage. The throughput may be measured based on the number of equal sized packets that the paths 1510 can carry from the client 1504 to the host 1502. The latency may be based upon the time taken by the packets through the paths 1510 from the client 1502 to the host 1504 (e.g., based on the timing of corresponding acknowledgement messages and/or timestamp of receipt of the corresponding message in the acknowledgement messages). The loss percentage may be based on the number of packets that may have been transmitted by the client 1504 but may have failed to reach the host 1502.

This process may continue as previously described until the client 1504 completes all the bursts and discovers the highest working PMTU. However, rather than always selecting the highest discovered PMTU as the final PMTU to use, the client 1504 may determine the optimal PMTU to use based on the network characteristics, such as throughput, latency, and loss percentage, computed after a burst, in addition to the size of the last working probe packet (temporary PMTU), also computed after the burst. In other words, the client 1504 may not necessarily select the highest discovered PMTU but may select a performance optimal PMTU based on the additional parameters as well. Without this enhancement, a larger discovered PMTU might artificially constrain the paths 1510 to lower number of paths or to only a single path exhibiting adverse network characteristics. For example, path 1510*d* may be the only path that supports the highest discovered PMTU but path 1510*d* may be associated with any of low throughput, high latency and/or high loss percentage. But a lower PMTU might advantageously allow alternative paths, e.g. paths 1510*a*, 1510*b*, and 1510*c* to be used with better or similar characteristics.

Thus, the client 1504 (and/or the host 1502) may implicitly determine a performance optimal path for data based on multiple parameters including working PMTU, throughput, latency, and loss percentage. For example, in a single logical stream scenario, the client 1504 may implicitly select a performance optimal path (based not only on the PMTU but also on the additional parameters of throughput, latency, and loss percentage) to transmit the single data stream.

In addition to the network characteristics described above, the client 1504 (and/or the host 1502) may select a working PMTU to use based on the type of data being transmitted. For example, interactive data may have relatively smaller packets, not necessarily requiring a higher PMTU, but may have a lower tolerance for latency and packet loss. Therefore, the client 1504 may select a lower working PMTU (and potentially more paths among the paths 1510) to transmit and/or receive interactive data if that PMTU has been determined to be associated with lower latency, and a lower loss percentage. In contrast, bulk data may have relatively large packets but may have a higher tolerance to latency and loss percentage (e.g., lost packets may be transmitted as bulk data may not be used in real-time). Therefore, the client 1504 may select a higher (or the highest discovered) working PMTU (and potentially less paths among the paths 1510, e.g., only path 1510*d* as in the previously described example) to transmit and/or receive bulk data, even though that PMTU may have been determined to be associated with a higher latency, and a higher loss percentage. In other words, the interactive data may have a higher priority for transmission through the paths 1510 compared to the bulk data, and for the interactive data the client 1504 may select a working PMTU (and thus also implicitly select a path or paths 1510) that may increase a likelihood of faster transmission.

In some embodiments, in selecting a lower but performance optimal PMTU to use compared to the highest discovered PMTU, the client 1504 (and/or the host 1502) may not necessarily reduce the size of their allocated send and receive buffers. Because the client 1504 (and/or the host 1502) may quickly alternate between sending different types of data (e.g. interactive versus bulk data), the memory allocated to the send and receive buffers may continue to be sized according to the highest discovered PMTU, as described in the multiple examples throughout the disclosure. However, the client 1504 (and/or the host 1502) may generate smaller packet sizes consistent with the type of data being sent and the respective performance optimal PMTU, thus potentially using less of the available memory allocated for the send buffers.

Furthermore, the client 1504 and/or the host 1502 may monitor the network conditions. If any change in the network conditions is detected (e.g., based on re-routing or multi-pathing between the gateway 1506 and the gateway 1508), one or more of the client 1504 and the host 1502 may trigger again the PMTU discovery and determination of throughput, latency, and/or loss percentage as previously described. In other words, when network characteristics change beyond certain thresholds, the performance optimal PMTU may be recalculated.

In other embodiments, as an optional and non-limiting enhancement, gateways, SD-WAN appliances, and/or cloud services (e.g. the gateway 1506 and the gateway 1508) may send hints to the client 1504 and/or the host 1502 when the paths 1510 change, e.g., when paths are added or removed, or when network characteristics of existing paths 1510 change. For example, these hints may be delivered using out-of-band control paths between gateway 1506, gateway 1508, client 1504, and/or the host 1502. As another non-limiting example, these hints may be delivered by the gateway 1506 or gateway 1508 by placing or modifying tags in clear-text extensions to TLS or DTLS. The hints may cause the client 1504 and/or the host 1502 to re-trigger the process of discovering the performance optimal PMTU.

The aforementioned description of the paths 1510 within a software defined network is merely intended as an example. Determining PMTU and additionally throughput, latency, and loss percentage for the multiple paths using the examples disclosed herein may apply to a non-software defined network scenario as well.

In a multi-stream scenario, such as a multi-stream ICA scenario, the client 1504 and the host 1502 may be aware of the multiple streams, e.g., the multiple ICA streams connected to a single ICA virtual session. A stream may be initially assigned to at least one of the paths 1510. To determine the PMTUs of the paths 1510, the client 1504 (and/or the host 1502) may implement multiple bursts of probe packets as described in the multiple examples throughout this disclosure. In addition to determining the PMTUs for one or more of the paths 1510, the client 1504 may measure other network characteristics of the paths 1510. For example, the client 1504 may transmit multiple packets of the same size to determine throughput, latency, and loss percentage of each of the paths 1510. The throughput may be measured based on the number of equal sized packets that each of the paths 1510 can carry from the client 1504 to the host 1502. The latency may be based upon the time taken by the packets through each of the paths 1510 from the client 1502 to the host 1504 (e.g., based on the timing of corresponding acknowledgement messages and/or timestamp of receipt of the corresponding message in the acknowledgement messages). The loss percentage may be based on the number of packets that may have been transmitted by the client 1504 but may have failed to reach the host 1502.

Having measured the PMTU for the individual paths 1510, the client 1504 (and/or the host 1502) may select or re-assign multiple paths 1510 for the different streams based on the characteristics and the types of the stream. For example, as previously discussed also in the context of a single-stream scenario, interactive data may have relatively smaller packets, not necessarily requiring a higher PMTU, but may have a lower tolerance for latency and packet loss. Therefore, the client 1504 may select a path (among the paths 1510) with a lower PMTU, lower latency, and a lower loss percentage to transmit and/or receive interactive data. In contrast, bulk data may have relatively large packets but may have a higher tolerance to latency and loss percentage (e.g., lost packets may be transmitted as bulk data may not be used in real-time). Therefore, the client 1504 may select a path with a higher PMTU, a higher latency, and a higher loss percentage to transmit and/or receive bulk data. In other words, the interactive data may have a higher priority for transmission through the paths 1510 compared to the bulk data, and for the interactive data the client 1504 may select a path that may increase a likelihood of faster transmission.

As previously discussed also in the context of a single-stream scenario, the client 1504 and the host 1502 may monitor the network conditions. If any change in the network conditions is detected, one or more of the client 1504 and the host 1502 may trigger the PMTU discovery and determination of throughput, latency, and/or loss percentage for one or more of the paths 1510. In other words, when network characteristics change (e.g., based on re-routing or multi-pathing), a separate determination of these parameters may be made for the individual paths 1510, which can then be used to select a path to transmit data stream according to the type of data (e.g., bulk data versus interactive data). When new parameters are calculated in response to detecting a change in network characteristics, a sending computing device (either of the client 1504 or the host 1502) may flush queued packets and queue corresponding new packets based on the new parameters (e.g., smaller packets when PMTU is decreased). The sending computing device may also requeue lost and non-acknowledged packets (size adjusted according to the new parameters), and resend already acknowledged packets. The sending computing device may further use control packets to reset sequence numbers.

The following paragraphs (M1) through (M39) describe examples of methods that may be implemented in accordance with the present disclosure.

(M1) A method comprising transmitting, by a client device to a host device, a plurality of packets via a network between the client device and the host device, the plurality of packets sized relative to one another within a search range defined by a maximum packet size and a minimum packet size; receiving, by the client device, one or more responses from the host device, at least one response indicative of validity of a packet received at the host device; adjusting, by the client device, a path maximum transmission unit (PMTU) of the network based on the receipt of the one or more responses; and transmitting, by the client device to the host device, data packets via the network sized according to the adjusted PMTU so as to prevent fragmentation of the data packets during their transmission.

(M2) A method may be performed as described in paragraph (M1) further comprising setting, by the client device, a second maximum packet size and a second minimum packet size based on the one or more responses; transmitting, by the client device to the host device, a second plurality of packets via the network, the second plurality of packets sized relative to one another within an updated search range defined by the second maximum packet size and the second minimum packet size; receiving, by the client device, one or more second responses from the host device, at least one second response indicative of validity of a packet of the second plurality of packets received at the host device; and adjusting, by the client device, the PMTU of the network based on the receipt of the one or more second responses.

(M3) A method may be performed as described in any of paragraphs (M1) through (M2) wherein the second maximum packet size is smaller than the largest packet in the plurality of packets that was not validly received at the host device.

(M4) A method may be performed as described in any of paragraphs (M1) through (M3) wherein the second minimum packet size is larger than the largest packet in the plurality of packets that was validly received at the host device.

(M5) A method may be performed as described in any of paragraphs (M1) through (M4) wherein the client device transmits the second plurality of packets in response to determining that the second minimum packet size is smaller than the second maximum packet size.

(M6) A method may be performed as described in any of paragraphs (M1) through (M5) wherein the client device transmits the second plurality of packets in response to determining that the second minimum packet size is smaller than the second maximum packet size.

(M7) A method may be performed as described in any of paragraphs (M1) through (M6) wherein the plurality of packets further comprises a trailer packet of a size between the minimum packet size and the size of a previous packet that was validly received at the host device, wherein a response for the trailer packet from the host device indicates the end of an iteration of the plurality of packets allowing for a grace time for out of order packets, and wherein the receipt of the response for the trailer packet indicates a state of the network.

(M8) A method may be performed as described in any of paragraphs (M1) through (M7) wherein the state of the network comprises package loss and congestion conditions.

(M9) A method may be performed as described in any of paragraphs (M1) through (M8) further comprising in response to determining by the client device that the trailer packet was validly received at the host device: processing, by the client device, a response matrix for the plurality of packets based on determining that at least one packet in the plurality of packets was received at the host device, the response matrix comprising a corresponding indication whether each packet in the plurality of packets was validly received at the host device; and providing, by the client device, the grace time based on determining that at least one packet of the plurality of packets was not received at the host device.

(M10) A method may be performed as described in any of paragraphs (M1) through (M9) further comprising in response to determining by the client device that the trailer packet was not validly received at the host device: setting, by the client device, a backout time; and transmitting, by the client device, a second plurality of packets after the backout time.

(M11) A method may be performed as described in any of paragraphs (M1) through (M10) wherein the second plurality of packets further comprises a second trailer packet of a size between the second minimum packet size and the size as the largest packet in the plurality of packets that was validly received at the host device, wherein a response for the second trailer packet from the host device indicates the end of an iteration of the second plurality of packets allowing for a grace time for out of order packets in the second plurality of packets, and wherein the receipt of the response for the second trailer packet indicates a state of the network.

(M12) A method may be performed as described in any of paragraphs (M1) through (M11) further comprising in response to determining by the client device that at least one packet in the plurality of packets was not validly received and that a retry limit has not been reached: including, by the client device, the at least one packet in the second plurality of packets.

(M13) A method may be performed as described in any of paragraphs (M1) through (M12) wherein the minimum packet size is larger than a previous packet that was validly received at the host device.

(M14) A method may be performed as described in any of paragraphs (M1) through (M13) wherein the minimum packet size is at least one of the minimum packet size supported by the client device network interface and a predetermined minimum possible packet size.

(M15) A method may be performed as described in any of paragraphs (M1) through (M14) wherein the plurality of packets are transmitted in ascending order according to size.

(M16) A method may be performed as described in any of paragraphs (M1) through (M15) wherein the plurality of packets are transmitted in descending order according to size.

(M17) A method may be performed as described in any of paragraphs (M1) through (M16) wherein the size of the plurality of packets is varied randomly for the transmission.

(M18) A method may be performed as described in any of paragraphs (M1) through (M17) further comprising transmitting, by the client device to the host device, a packet of a maximum possible packet size; and transmitting, by the client device to the host device the plurality of packets in response to determining that the packet of the maximum possible size was not validly received at the host device.

(M19) A method may be performed as described in any of paragraphs (M1) through (M18) further comprising determining, by the client device, a minimum of network interface maximum transmission units (MTUs) supported by a plurality of network devices in the network based on an initial protocol handshake between the client device, the host device, and the plurality of network devices; and setting, by the client device, the maximum packet size of the plurality of packets to be the determined minimum of network interface MTUs.

(M20) A method may be performed as described in any of paragraphs (M1) through (M19) further comprising determining, by the client device, a first temporary PMTU based on the receipt of one or more responses; determining, by the client device, at least one of a first loss, a first latency, and a first throughput of the network based on an exchange of a first set of packets of the same size via the network with the host device; transmitting, by the client device to the host device, a second plurality of packets via the network, the second plurality of packets sized relative to one another within an updated search range defined by a second maximum packet size and a second minimum packet size; determining, by the client device a second temporary PMTU of the network based on receipt of one or more second responses from the host device, at least one second response indicative of validity of a second packet of the second plurality of packets received at the host device; determining, by the client device, at least one of a second loss, a second latency, and a second throughput of the network based on an exchange of a second set of packets of the same size via the network with the host device; and adjusting, by the client device, the PMTU as a performance optimal PMTU based on: the first temporary PMTU, the second temporary PMTU, at least one of the first loss, the first latency, and the first throughput, and at least one of the second loss, the second latency, and the second throughput.

(M21) A method may be performed as described in any of paragraphs (M1) through (M20) further comprising receiving, by the client device, an indication from a network component that one or more network characteristics have changed; readjusting, by the client device, the performance optimal PMTU based on an updated temporary PMTU and at least one of an updated loss, an updated latency, and an updated throughput of the network.

(M22) A method may be performed as described in any of paragraphs (M1) through (M21) wherein the PMTU is adjusted for a path in the network.

(M23) A method comprising transmitting, by a client device to a host device, a plurality of packets via a network connection between the client device and the host device, the plurality of packets sized relative to one another within a search range defined by a maximum packet size and a minimum packet size; receiving, by the client device, one or more responses from the host device, at least one response indicative of validity of a packet received at the host device; determining, by the client device, a path maximum transmission unit (PMTU) of the network connection based on the receipt of the one or more responses; adjusting, by the client device, a size of a buffer of the client device based on the PMTU of the network connection; and providing, by the client device, packet data between the client device and the host device using the adjusted buffer so as to avoid disruption of the network connection between the client device and the host device.

(M24) A method may be performed as described in paragraph (M23) wherein the buffer comprises a receive buffer, the method further comprising: initializing, by the client device, the receive buffer to a predetermined maximum possible packet size.

(M25) A method may be performed as described in any of the paragraphs (M23) through (M24) wherein the predetermined maximum possible packet size is based on maximum packet size supported by the network connection, wherein the maximum packet size is determined based on a protocol handshake between the client device, the host device, and one or more intermediary devices.

(M26) A method may be performed as described in any of the paragraphs (M23) through (M25) wherein the buffer comprises a send buffer, the method further comprising: initializing, by the client device, the send buffer to a predetermined minimum packet size.

(M27) A method may be performed as described in any of the paragraphs (M23) through (M26) wherein the buffer comprises a communication stack buffer of a presentation layer.

(M28) A method may be performed as described in any of the paragraphs (M23) through (M27) wherein the buffer comprises a communication stack buffer of a transport layer.

(M29) A method may be performed as described in any of the paragraphs (M23) through (M28) wherein an initialization of data communication via the network connection and the determination of the PMTU are performed in parallel.

(M30) A method may be performed as described in any of the paragraphs (M23) through (M29) wherein size of a buffer of the host device is adjusted based on the PMTU of the network connection.

(M31) A method comprising transmitting, by a client device to a host device, packets via a plurality of communication channels between the client device and the host device; determining, by a client device, path maximum transmission units (PMTUs) for the plurality of communication channels based on valid receipt of the packets via the communication channels; and transmitting, by the client device, a first stream of packets between the client device and the host device via a first communication channel of the plurality of communication channels based on a first PMTU of the first communication channel and a priority for the first stream.

(M32) A method may be performed as described in paragraph (M31) further comprising determining, by the client device, at least one of a loss, latency, or throughput of the first communication channel based upon an exchange of a first plurality of packets of the same size via the first communication channel; determining, by the client device, at least one of a loss, latency, or throughput of a second communication channel based upon an exchange of a second plurality of packets of the same size via the second communication channel; assigning, by the client device, the first stream with the first communication channel further based on at least one of the loss, latency, or throughput of the first communication channel; and assigning, by the client device, a second stream of packets with the second communication channel of the plurality of communication channels based on a priority of the second stream, a second PMTU of the second communication channel, and at least one of the loss, latency, or throughput of the second communication channel.

(M33) A method may be performed as described in any of the paragraphs (M31) through (M32) wherein corresponding priorities of the first and second streams are based upon the corresponding data type.

(M34) A method may be performed as described in any of the paragraphs (M31) through (M33) wherein the data type for the first stream is interactive data and the data type for the second stream is bulk data, and wherein the priority of the first stream is higher than the priority of the second stream.

(M35) A method may be performed as described in any of the paragraphs (M31) through (M34) wherein the first PMTU is lower than the second PMTU, and at least one of the network latency or loss of the first stream is lower than the corresponding network latency or loss of the second stream.

(M36) A method may be performed as described in any of the paragraphs (M31) through (M35) wherein the first channel comprises a first path in a network between the client device and the host device, wherein the second channel comprises a second path in the network, and wherein the first path is parallel to the second path.

(M37) A method may be performed as described in any of the paragraphs (M31) through (M36) wherein the first channel comprises multiple paths within a software defined network, and wherein the first stream of packets is transmitted through the multiple paths.

(M38) A method may be performed as described in any of the paragraphs (M31) through (M37) further comprising receiving, by the client device from a network component in the network containing the first and the second communication channels, an indication that a network condition has changed; and updating, by the client device based on the indication, at least one of the first PMTU or the second PMTU and at least one of: the loss of the first communication channel, the latency of the first communication channel, the throughput of the first communication channel, the loss of the second communication channel, the latency of the second communication channel, and the throughput of the second communication channel.

(M39) A method may be performed as described in any of the paragraphs (M31) through (M38) further comprising detecting, by the client device, a change in a network condition of the first communication channel; and determining, by the client device, an updated PMTU of the first communication channel.

While the aforementioned paragraphs reference methods, it is to be understood that alternative aspects including similar features may be embodied in computer readable media, one or more devices or apparatuses, and/or systems such as data processing systems.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    transmitting, by a client device to a host device, a plurality of packets via a network between the client device and the host device, the plurality of packets sized relative to one another within a range defined by a predetermined maximum packet size and a predetermined minimum packet size;
    receiving, by the client device, one or more responses from the host device, at least one response indicative of validity of a packet received at the host device;
    adjusting, by the client device, a path maximum transmission unit (PMTU) of the network based on the receipt of the one or more responses; and
    transmitting, by the client device to the host device via the network, data packets sized according to the adjusted PMTU so as to prevent fragmentation of the data packets during their transmission.

2. The method of claim 1, further comprising:
    setting, by the client device and based on the one or more responses, a second maximum packet size and a second minimum packet size;
    transmitting, by the client device to the host device, a second plurality of packets via the network, the second plurality of packets sized relative to one another within an updated range defined by the second maximum packet size and the second minimum packet size;
    receiving, by the client device, one or more second responses from the host device, at least one second response indicative of validity of a packet of the second plurality of packets received at the host device; and
    adjusting, by the client device, the PMTU of the network based on the receipt of the one or more second responses.

3. The method of claim 2, wherein the second maximum packet size is smaller than a largest packet in the plurality of packets that was not validly received at the host device.

4. The method of claim 2, wherein the second minimum packet size is larger than a largest packet in the plurality of packets that was validly received at the host device.

5. The method of claim 4, wherein the client device transmits the second plurality of packets in response to determining that the second minimum packet size is smaller than the second maximum packet size.

6. The method of claim 5, wherein the client device transmits the second plurality of packets in response to determining that the second maximum packet size is larger than one byte added to a size of the largest packet of the plurality of packets that was validly received at the host device.

7. The method of claim 2, wherein the second plurality of packets further comprises a second trailer packet of a size between the second minimum packet size and the size as a largest packet in the plurality of packets that was validly received at the host device, wherein a response for the second trailer packet from the host device indicates an end of an iteration of the second plurality of packets allowing for a grace time for out of order packets in the second plurality of packets, and wherein the receipt of the response for the second trailer packet indicates a state of the network.

8. The method of claim 2, further comprising:
    in response to determining by the client device that at least one packet in the plurality of packets was not validly received and that a retry limit has not been reached:
        including, by the client device, the at least one packet in the second plurality of packets.

9. The method of claim 1, wherein the plurality of packets further comprises a trailer packet of a size between the predetermined minimum packet size and the size of a previous packet that was validly received at the host device, wherein a response for the trailer packet from the host device indicates an end of an iteration of the plurality of packets allowing for a grace time for out of order packets, and wherein the receipt of the response for the trailer packet indicates a state of the network.

10. The method of claim 9, further comprising:
    in response to determining by the client device that the trailer packet was not validly received at the host device:
        setting, by the client device, a backout time; and
        transmitting, by the client device, a second plurality of packets after the backout time.

11. The method of claim 9, wherein the state of the network comprises package loss and congestion conditions.

12. The method of claim 9, further comprising:
    in response to determining by the client device that the trailer packet was validly received at the host device:
        processing, by the client device, a response matrix for the plurality of packets based on determining that at least one packet in the plurality of packets was received at the host device, the response matrix comprising a corresponding indication whether each packet in the plurality of packets was validly received at the host device; and
        providing, by the client device, the grace time based on determining that at least one packet of the plurality of packets was not received at the host device.

13. The method of claim 1, wherein the predetermined minimum packet size is larger than a previous packet that was validly received at the host device.

14. The method of claim 1, wherein the predetermined minimum packet size is a minimum packet size supported by the network or a network interface of the client device; and
    wherein the predetermined maximum packet size is a maximum packet size supported by the network or the network interface of the client device.

15. The method of claim 1, wherein the plurality of packets are transmitted in ascending order according to sizes of the plurality of packets.

16. The method of claim 1, wherein the plurality of packets are transmitted in descending order according to sizes of the plurality of packets.

17. The method of claim 1, wherein sizes of the plurality of packets are varied randomly for the transmission.

18. The method of claim 1, further comprising:
    transmitting, by the client device to the host device, a packet of a maximum possible packet size; and
    transmitting, by the client device to the host device the plurality of packets in response to determining that the packet of the maximum possible packet size was not validly received at the host device.

19. The method of claim 1, further comprising:
    determining, by the client device, a minimum of network interface maximum transmission units (MTUs) supported by a plurality of network devices in the network based on an initial protocol handshake between the client device, the host device, and the plurality of network devices; and setting, by the client device, the predetermined maximum packet size of the plurality of packets to be the determined minimum of network interface MTUs.

20. The method of claim 1, further comprising:
determining, by the client device, a first temporary PMTU based on the receipt of one or more responses;
determining, by the client device and based on an exchange of a first set of packets of a first same size via the network with the host device, at least one of a first loss, a first latency, or a first throughput of the network;
transmitting, by the client device to the host device, a second plurality of packets via the network, the second plurality of packets sized relative to one another within an updated range defined by a second maximum packet size and a second minimum packet size;
determining, by the client device a second temporary PMTU of the network based on receipt of one or more second responses from the host device, at least one second response indicative of validity of a second packet of the second plurality of packets received at the host device;
determining, by the client device and based on an exchange of a second set of packets of a second same size via the network with the host device, at least one of a second loss, a second latency, or a second throughput of the network; and
adjusting, by the client device, the PMTU as a performance optimal PMTU based on:
the first temporary PMTU,
the second temporary PMTU,
at least one of the first loss, the first latency, or the first throughput, and
at least one of the second loss, the second latency, or the second throughput.

21. The method of claim 20, further comprising:
receiving, by the client device, an indication from a network component that one or more network characteristics have changed; and
readjusting, by the client device, the performance optimal PMTU based on an updated temporary PMTU and at least one of an updated loss, an updated latency, or an updated throughput of the network.

22. The method of claim 1, wherein the PMTU is adjusted for a path in the network.

23. A method comprising:
transmitting, by a client device to a host device, a packet of a maximum possible packet size via a network between the client device and the host device;
transmitting, by the client device to the host device via the network, a plurality of packets in response to determining that the packet of the maximum possible packet size was not validly received at the host device, the plurality of packets sized relative to one another within a range defined by a maximum packet size and a minimum packet size;
receiving, by the client device, one or more responses from the host device, at least one response indicative of validity of a packet received at the host device;
adjusting, by the client device, a path maximum transmission unit (PMTU) of the network based on the receipt of the one or more responses; and
transmitting, by the client device to the host device via the network, data packets sized according to the adjusted PMTU so as to prevent fragmentation of the data packets during their transmission.

* * * * *